United States Patent
Zhang et al.

(10) Patent No.: US 11,523,288 B2
(45) Date of Patent: Dec. 6, 2022

(54) DATA ANALYSIS APPARATUS, SYSTEM, AND METHOD

(71) Applicant: HUAWEI TECHNOLOGIES CO., LTD., Shenzhen (CN)

(72) Inventors: Jin Zhang, Shanghai (CN); Yixu Xu, Shanghai (CN); Yan Wang, Shanghai (CN); Dong Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 191 days.

(21) Appl. No.: 16/985,195

(22) Filed: Aug. 4, 2020

(65) Prior Publication Data
US 2020/0367074 A1   Nov. 19, 2020

Related U.S. Application Data

(63) Continuation of application No. PCT/CN2018/119000, filed on Dec. 3, 2018.

(30) Foreign Application Priority Data

Feb. 5, 2018  (CN) .......................... 201810112132.1

(51) Int. Cl.
*H04W 24/02* (2009.01)
*G06N 20/00* (2019.01)
*G06N 5/04* (2006.01)

(52) U.S. Cl.
CPC .............. *H04W 24/02* (2013.01); *G06N 5/04* (2013.01); *G06N 20/00* (2019.01)

(58) Field of Classification Search
CPC ................. H04W 24/02; G06N 5/04
(Continued)

(56) References Cited

U.S. PATENT DOCUMENTS 8,352,495 B2 * 1/2013 LaRowe ........... G06F 16/90335
                                                              707/738
10,958,585 B2 * 3/2021 Safavi .................. H04L 41/069
(Continued)

FOREIGN PATENT DOCUMENTS

| CN | 1472671 A  | 2/2004 |
|----|------------|--------|
| CN | 102118245 A | 7/2011 |
| CN | 106488481 A | 3/2017 |
| CN | 107222875 A | 9/2017 |

OTHER PUBLICATIONS

Imran, Ali, Ahmed Zoha, and Adnan Abu-Dayya. "Challenges in 5G: how to empower SON with big data for enabling 5G." IEEE network 28.6 (2014): pp. 27-33. (Year: 2014).*

(Continued)

*Primary Examiner* — Satish Rampuria
(74) *Attorney, Agent, or Firm* — Rimon PC

(57) ABSTRACT

Various embodiments provide a data analysis apparatus, system, and method. The data analysis apparatus may collect data of a network node in a mobile access network, and then perform data analysis and adjust a configuration parameter of the network node, to implement targeted data analysis and parameter adjustment for the network node, so that a speed of data analysis and configuration parameter adjustment can be improved. In addition, modules of the data analysis apparatus may run in parallel, so that the speed of data analysis and configuration parameter adjustment can be further improved.

11 Claims, 10 Drawing Sheets

(58) Field of Classification Search
USPC .................................................. 700/90–118
See application file for complete search history.

(56) References Cited

U.S. PATENT DOCUMENTS

| | | | | |
|---|---|---|---|---|
| 2006/0037016 | A1* | 2/2006 | Saha | G06F 8/61 717/178 |
| 2007/0022069 | A1 | 1/2007 | Goodman | |
| 2009/0254847 | A1* | 10/2009 | Counts | G06Q 10/04 715/771 |
| 2015/0135012 | A1* | 5/2015 | Bhalla | H04L 41/0631 714/26 |
| 2016/0020944 | A1 | 1/2016 | Taylor et al. | |
| 2016/0205697 | A1* | 7/2016 | Tan | H04W 24/02 370/329 |
| 2017/0116318 | A1* | 4/2017 | Wolfram | G06F 16/285 |
| 2017/0134590 | A1* | 5/2017 | Mathison | H04L 12/1407 |

OTHER PUBLICATIONS

Friedman, Nir. "Inferring cellular networks using probabilistic graphical models." Science 303.5659 (2004): pp. 799-805. (Year: 2004).*

Tango, Fabio, and Marco Botta. "Real-time detection system of driver distraction using machine learning." IEEE Transactions on Intelligent Transportation Systems 14.2 (2013): pp. 894-905. (Year: 2013).*

Drivas, Ioannis C., et al. "Big data analytics for search engine optimization." Big Data and Cognitive Computing 4.2 (2020):pp. 1-22. (Year: 2020).*

Dekker, Rommert. "Applications of maintenance optimization models: a review and analysis." Reliability engineering & system safety 51.3 (1996): pp. 229-240. (Year: 1996).*

Shahriari, Bobak, et al. "Taking the human out of the loop: A review of Bayesian optimization." Proceedings of the IEEE 104.1 (2015): pp. 148-175. (Year: 2015).*

5GPP:"View on 5G Architecture",5G Architecture White Paper V2.0,Dec. 15, 2017,XP055687248,total 140 pages.

"Internet of Things—Architecture IoT—A Deliverable D1.5—Final architectural reference model for the IoT v3.0",ETSI DRAFT;D1-5,European Telecommunications Standards Institute(ETSI),650,Toute Des Lucioles; F-06921 Sophia-Antipolis,France,vol. SmartM2M—Open, Jul. 29, 2015,total 482 pages.

Uwe Herzog et al:"Quality of service provision and capacity expansion through extended-DSA for 5G",Transactions on emerging telecommunications technologies, Sep. 1, 2016,XP055771098,total 100 pages.

* cited by examiner

DATA ANALYSIS APPARATUS, SYSTEM, AND METHOD

CROSS-REFERENCE TO RELATED APPLICATIONS

This application is a continuation of International Application No. PCT/CN2018/119000, filed on Dec. 3, 2018, which claims priority to Chinese Patent Application No. 201810112132.1, filed on Feb. 5, 2018. The disclosures of the aforementioned applications are hereby incorporated by reference in their entireties.

TECHNICAL FIELD

The present disclosure relates to the field of mobile communications technologies, and in particular, to a data analysis apparatus, system, and method.

BACKGROUND

A large amount of data is generated in a mobile network at any moment. For example, the generated data includes network connection data, network element device data, user data, service data, and the like. Currently, the data generated in the mobile network is analyzed based on a machine learning technology, and the mobile network is optimized based on an analysis result, to better support a user service. This has become an evolution trend of the mobile network.

The mobile network includes a mobile access network and a mobile core network. Currently, there is no corresponding data analysis method for the mobile access network. In addition, because wireless air interface data in the mobile access network has a relatively short validity period, a relatively high requirement is posed on a processing speed of data analysis.

Therefore, how to quickly analyze the data in the mobile access network is a problem that needs to be resolved currently.

SUMMARY

Various embodiments provide a data analysis apparatus, system, and method, to quickly analyze data of a network element in a mobile access network, and adjust a configuration parameter of the network element based on an analysis result.

According to a first aspect, some embodiments provide a data analysis apparatus. The apparatus includes: a first module, configured to: obtain first feature extraction information, obtain first data of a network node based on the first feature extraction information, generate a first feature vector based on the first data and the first feature extraction information, and send the first feature vector; a second module, configured to: obtain model information, and create a model instance based on the model information; and receive the first feature vector from the first module, generate a prediction result based on the first feature vector and the model instance, and send the prediction result; and a third module, configured to: obtain policy information, receive the prediction result from the second module, determine a configuration parameter value based on the prediction result and the policy information, and update a configuration parameter of the network node based on the configuration parameter value.

The data analysis apparatus may collect data of a network node in a mobile access network, and then perform data analysis and adjust a configuration parameter of the network node, to implement targeted data analysis and parameter adjustment for the network node, so that a speed of data analysis and configuration parameter adjustment can be improved. In addition, the modules may run in parallel, so that the speed of data analysis and configuration parameter adjustment can be further improved.

In one example implementation, the data analysis apparatus further includes a fourth module, configured to send the first feature extraction information, the model information, and the policy information.

In a first implementation, that the fourth module is configured to send the first feature extraction information, the model information, and the policy information includes: sending, by the fourth module, the model information to the second module, sending the first feature extraction information to the first module, and sending the policy information to the third module.

In this way, the fourth module respectively sends the first feature extraction information, the model information, and the policy information to the first module, the second module, and the third module.

In this implementation, further, the first feature extraction information includes a model identifier, the model information includes the model identifier, and the model identifier is used to identify the model instance; and the second module is further configured to send a first subscription message to the first module, where the first subscription message includes the model identifier, and the first subscription message is used to subscribe to, from the first module, the first feature vector corresponding to the model identifier.

In this way, the second module can subscribe to the first feature vector from the first module. After generating the first feature vector, the first module may directly send a second feature vector to the second module.

In a second implementation, that the fourth module is configured to send the first feature extraction information, the model information, and the policy information includes: sending, by the fourth module, the first feature extraction information, the model information, and the policy information to the second module; and then, sending, by the second module, the first feature extraction information to the first module, and sending the policy information to the third module.

In this way, the fourth module sends the first feature extraction information, the model information, and the policy information to the second module, and then the second module respectively sends the first feature extraction information and the policy information to the first module and the third module.

In this implementation, further, the first feature extraction information includes a model identifier, the model information includes the model identifier, and the model identifier is used to identify the model instance; and the sending, by the second module, the first feature extraction information to the first module includes: sending, by the second module, a second subscription message to the first module, where the second subscription message includes the first feature extraction information, and the second subscription message is used to subscribe to, from the first module, the first feature vector corresponding to the model identifier.

In this way, the second module can subscribe to the first feature vector from the first module. After generating the first feature vector, the first module may directly send a second feature vector to the second module.

In one example implementation, the fourth module is further configured to send a third subscription message to the first module, where the third subscription message includes second feature extraction information. The first module is further configured to: obtain second data of the network node based on the second feature extraction information, generate a second feature vector based on the second data and the second feature extraction information, and send the second feature vector to the fourth module. The fourth module is further configured to train, based on the second feature vector, a model corresponding to the model information.

In this way, the fourth module obtains the second feature vector by subscribing from the first module, to train the model based on the second feature vector and generate the model information. The model information may be sent to the second module and used by the second module to generate the model instance. In this way, model training is separated from model use. To be specific, the fourth module trains the model, and the second module uses the model instance. This helps further improve the speed of data analysis and configuration parameter adjustment for the network node.

In one example implementation, the fourth module is further configured to: receive an indication message from a monitoring apparatus, where the indication message includes a model type of the model corresponding to the model information, and the indication message is used to indicate to create the model and start training of the model; and send a response message to the monitoring apparatus, where the response message is used to indicate that the training of the model is completed.

In this way, an external monitoring apparatus is used to trigger the fourth module of the data analysis apparatus to create and train the model. This helps control the data analysis apparatus.

In another example implementation, the obtaining, by the first module, first feature extraction information includes: obtaining, by the first module, the first feature extraction information from another data analysis apparatus; the obtaining, by the second module, model information includes: obtaining, by the second module, the model information from the another data analysis apparatus; and the obtaining, by the third module, policy information includes: obtaining, by the third module, the policy information from the another data analysis apparatus.

In any one of the foregoing embodiments, in an implementation, the data analysis apparatus is located in a central unit CU, and the network node is the CU. Alternatively, the data analysis apparatus is located in a distributed unit DU, and the network node is the DU. Alternatively, the data analysis apparatus is located in a radio access device, and the network node is the radio access device.

In other words, the data analysis apparatus may be located in the CU, the DU, or the radio access device, and is configured to perform data collection, data analysis, and configuration parameter adjustment for the CU, the DU, or the radio access device.

According to a second aspect, this application provides a data analysis system. The system includes a first data analysis apparatus and a second data analysis apparatus. The first data analysis apparatus is configured to send first feature extraction information, model information, and policy information. The second data analysis apparatus is configured to: receive the first feature extraction information, the model information, and the policy information from the first data analysis apparatus; obtain first data of a network node based on the first feature extraction information, and generate a first feature vector based on the first data and the first feature extraction information; create a model instance based on the model information; and generate a prediction result based on the first feature vector and the model instance, determine a configuration parameter value based on the prediction result and the policy information, and update a configuration parameter of the network node based on the configuration parameter value.

According to the data analysis system, after receiving the first feature extraction information, the model information, and the policy information that are sent by the first data analysis apparatus, the second data analysis apparatus may collect data of a network node in a mobile access network, and then perform data analysis and adjust a configuration parameter of the network node, to implement targeted data analysis and parameter adjustment for the network node, so that a speed of data analysis and configuration parameter adjustment can be improved.

In one example implementation, the first data analysis apparatus is further configured to: send a subscription message to the second data analysis apparatus, where the subscription message includes second feature extraction information, obtain a second feature vector from the second data analysis apparatus, and train, based on the second feature vector, a model corresponding to the model information; and the second data analysis apparatus is further configured to: obtain second data of the network node based on the second feature extraction information, generate the second feature vector based on the second data and the second feature extraction information, and send the second feature vector to the first data analysis apparatus.

In this way, the second data analysis apparatus accepts subscription of the first data analysis apparatus, and sends the second feature vector to the first data analysis apparatus. The first data analysis apparatus trains the model based on the second feature vector, to obtain the model information and send the model information to the second data analysis apparatus. The system separates model training from model use, and helps improve a speed of data collection, data analysis, and configuration parameter adjustment performed by the second data analysis apparatus for the network node. Especially, when computing resources of the second data analysis apparatus are insufficient and computing resources of the first data analysis apparatus are sufficient, the model training operation that consumes more computing resources is completed by the first data analysis apparatus, so that overall performance of the data analysis system can be improved.

In one example implementation, the first data analysis apparatus is further configured to: receive an indication message from a monitoring apparatus, where the indication message includes a model type of the model corresponding to the model information, and the indication message is used to indicate to create the model and start training of the model; and send a response message to the monitoring apparatus, where the response message is used to indicate that the training of the model is completed.

In this way, an external monitoring apparatus is used to trigger the first data analysis apparatus to create and train the model. This helps control the first data analysis apparatus.

In some embodiments, the data analysis system includes the monitoring apparatus.

In one example implementation, the first data analysis apparatus is located in a central unit CU, the second data analysis apparatus is located in a distributed unit DU, and the network node is the DU. Alternatively, the first data analysis apparatus is located in a first radio access device, the second data analysis apparatus is located in a second radio access device, and the network node is the second radio access device.

According to a third aspect, this application provides a data analysis method. The method includes: A data analysis apparatus obtains first feature extraction information, model information, and policy information. The data analysis apparatus obtains first data of a network node based on the first feature extraction information, generates a first feature vector based on the first data and the first feature extraction information, and creates a model instance based on the model information. The data analysis apparatus generates a prediction result based on the first feature vector and the model instance. The data analysis apparatus determines a configuration parameter value based on the prediction result and the policy information, and updates a configuration parameter of the network node based on the configuration parameter value.

According to the data analysis method, the data analysis apparatus may collect data of a network node in a mobile access network, and then perform data analysis and adjust a configuration parameter of the network node, to implement targeted data analysis and parameter adjustment for the network node, so that a speed of data analysis and configuration parameter adjustment can be improved.

In one example implementation, the data analysis apparatus obtains second feature extraction information, and obtains second data of the network node based on the second feature extraction information; the data analysis apparatus generates a second feature vector based on the second data and the second feature extraction information; and the data analysis apparatus trains, based on the second feature vector, a model corresponding to the model information.

In one example implementation, the data analysis apparatus receives an indication message from a monitoring apparatus, where the indication message includes a model type of the model corresponding to the model information, and the indication message is used to indicate to create the model and start training of the model. The data analysis apparatus sends a response message to the monitoring apparatus, where the response message is used to indicate that the training of the model is completed.

In this way, an external monitoring apparatus is used to trigger the data analysis apparatus to create and train the model. This helps control the data analysis apparatus.

In one example implementation, the data analysis apparatus is located in a central unit, and the network node is the CU. Alternatively, the data analysis apparatus is located in a distributed unit DU, and the network node is the DU. Alternatively, the data analysis apparatus is located in a radio access device, and the network node is the radio access device.

According to a fourth aspect, this application provides a data analysis method. The method includes: A first data analysis apparatus obtains model information. The first data analysis apparatus obtains first feature extraction information and policy information, and sends the first feature extraction information, the model information, and the policy information to a second data analysis apparatus.

In one example implementation, that the first data analysis apparatus obtains model information includes: The first data analysis apparatus receives an indication message from a monitoring apparatus, where the indication message includes a model type, and the indication message is used to indicate to create a model and start training of the model; and creates the model based on the model type and trains the model, to obtain the model information.

In one example implementation, that the first data analysis apparatus creates the model based on the model type and trains the model includes: The first data analysis apparatus sends a subscription message to the second data analysis apparatus, where the subscription message includes second feature extraction information; the first data analysis apparatus receives a second feature vector from the second data analysis apparatus, where the second feature vector is generated based on the second feature extraction information; and the first data analysis apparatus trains, based on the second feature vector, the model corresponding to the model type, to obtain the model information.

According to a fifth aspect, this application provides a data analysis method. The method includes: A second data analysis apparatus receives first feature extraction information, model information, and policy information from a first data analysis apparatus. The second data analysis apparatus obtains first data of a network node based on the first feature extraction information, generates a first feature vector based on the first data and the first feature extraction information, and creates a model instance based on the model information; and the second data analysis apparatus generates a prediction result based on the first feature vector and the model instance. The second data analysis apparatus determines a configuration parameter value based on the prediction result and the policy information, and updates a configuration parameter of the network node based on the configuration parameter value.

According to the data analysis method, after receiving the first feature extraction information, the model information, and the policy information that are sent by the first data analysis apparatus, the second data analysis apparatus may collect data of a network node in a mobile access network, and then perform data analysis and adjust a configuration parameter of the network node, to implement targeted data analysis and parameter adjustment for the network node, so that a speed of data analysis and configuration parameter adjustment can be improved.

In one example implementation, the second data analysis apparatus receives a subscription message from the first data analysis apparatus, where the subscription message includes second feature extraction information. The second data analysis apparatus obtains second data of the network node based on the second feature extraction information, and generates a second feature vector based on the second data and the second feature extraction information. The second data analysis apparatus sends the second feature vector to the first data analysis apparatus.

According to a sixth aspect, this application provides a data analysis apparatus. The apparatus has a function of implementing the embodiments of the third aspect. The function may be implemented by hardware, or may be implemented by hardware executing corresponding software. The hardware or the software includes one or more modules corresponding to the foregoing function.

According to a seventh aspect, this application provides a data analysis apparatus, including a processor and a memory. The memory is configured to store an instruction. When the apparatus runs, the processor executes the instruction stored in the memory, to enable the apparatus to perform the data analysis method in any one of the third aspect or the implementation methods of the third aspect. It should be noted that the memory may be integrated into the processor, or may be independent of the processor.

According to an eighth aspect, this application provides a data analysis apparatus. The apparatus includes a processor. The processor is configured to couple to a memory, read an instruction in the memory, and perform, according to the instruction, the data analysis method in any one of the third aspect or the implementation methods of the third aspect.

According to a ninth aspect, this application provides a data analysis apparatus. The apparatus has a function of implementing the embodiments of the fourth aspect. The function may be implemented by hardware, or may be implemented by hardware executing corresponding software. The hardware or the software includes one or more modules corresponding to the foregoing function.

According to a tenth aspect, this application provides a data analysis apparatus, including a processor and a memory. The memory is configured to store an instruction. When the apparatus runs, the processor executes the instruction stored in the memory, to enable the apparatus to perform the data analysis method in any one of the fourth aspect or the implementation methods of the fourth aspect. It should be noted that the memory may be integrated into the processor, or may be independent of the processor.

According to an eleventh aspect, this application provides a data analysis apparatus. The apparatus includes a processor. The processor is configured to couple to a memory, read an instruction in the memory, and perform, according to the instruction, the data analysis method in any one of the fourth aspect or the implementation methods of the fourth aspect.

According to a twelfth aspect, this application provides a data analysis apparatus. The apparatus has a function of implementing the embodiments of the fifth aspect. The function may be implemented by hardware, or may be implemented by hardware executing corresponding software. The hardware or the software includes one or more modules corresponding to the foregoing function.

According to a thirteenth aspect, this application provides a data analysis apparatus, including a processor and a memory. The memory is configured to store an instruction. When the apparatus runs, the processor executes the instruction stored in the memory, to enable the apparatus to perform the data analysis method in any one of the fifth aspect or the implementation methods of the fifth aspect. It should be noted that the memory may be integrated into the processor, or may be independent of the processor.

According to a fourteenth aspect, this application provides a data analysis apparatus. The apparatus includes a processor. The processor is configured to couple to a memory, read an instruction in the memory, and perform, according to the instruction, the data analysis method in any one of the fifth aspect or the implementation methods of the fifth aspect.

According to a fifteenth aspect, this application further provides a computer-readable storage medium. The computer-readable storage medium stores a program or an instruction. When the program or the instruction is run on a computer, the computer is enabled to perform the methods according to the foregoing aspects.

According to a sixteenth aspect, this application further provides a computer program product that includes an instruction. When the computer program product runs on a computer, the computer is enabled to perform the methods according to the foregoing aspects.

In one example implementation, the first feature extraction information in any one of the foregoing aspects includes input data parameter information, feature processing information, and output feature vector information, the input data parameter information is used to indicate to collect the first data, the feature processing information is used to indicate a processing manner of converting the first data into the first feature vector, and the output feature vector information is used to indicate a format of the sent first feature vector.

In one example implementation, the model information in any one of the foregoing aspects includes model description information, and the model description information is used to indicate parameter information corresponding to the model instance.

In one example implementation, the policy information in any one of the foregoing aspects includes configuration parameter information and prediction result information, the configuration parameter information is used to indicate the configuration parameter, and the prediction result information is used to indicate a mapping relationship between the configuration parameter value of the configuration parameter and the prediction result.

These aspects or other aspects of this application are clearer and more comprehensible in descriptions of the following embodiments.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise stated, "a plurality of" means two or more than two.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of new service scenarios, the technical solutions provided in the embodiments of this application are also applicable to similar technical problems.

Figure 1A:
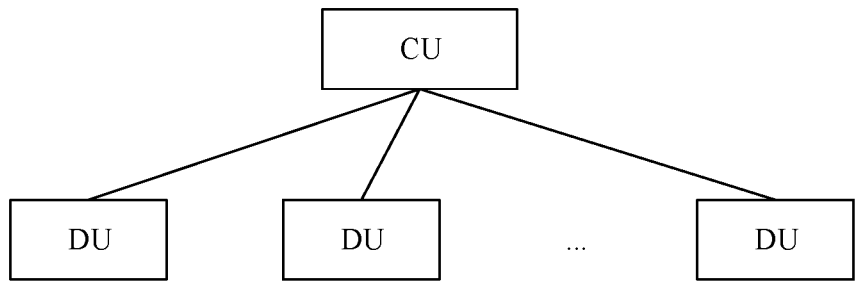
FIG. 1(a) is a schematic diagram of a possible network architecture of an access network according to this application.

FIG. 1(a) is a schematic diagram of an example network architecture of an access network to which this application is applicable. The network architecture includes a central unit (central unit, CU) and a distributed unit (distributed unit, DU).

Usually, one CU may be connected to one or more DUs. In addition, the DU has relatively limited computing resources due to factors such as a size and power consumption of the device.

A CU in a radio access network mainly supports a radio resource control (radio resource control, RRC) protocol, a packet data convergence protocol (packet data convergence protocol, PDCP), a service data adaptation protocol (service data adaptation protocol, SDAP), and the like. The CU is usually deployed at a central site and has relatively abundant computing resources.

A DU in the radio access network mainly supports a radio link control (radio link control, RLC) layer protocol, a media access control (media access control, MAC) layer protocol, a physical layer (PHY) protocol, and the like. DUs are usually deployed in a distributed mode.

Based on the network architecture shown in FIG. 1(a), embodiments in accordance with the present disclosure can provide corresponding apparatuses or systems for different application scenarios, to implement a data analysis method of this application.

In a first application scenario, the DU has relatively limited computing resources but can still complete model training, and the CU has relatively abundant computing resources and also can complete model training. In a second application scenario, the DU has relatively limited computing resources and cannot complete model training, and the CU has relatively abundant computing resources and can complete model training.

In the first application scenario, based on the network architecture shown in FIG. 1(a), a data analysis apparatus provided in this application may be deployed in the CU, and is mainly configured to: collect data such as a context, a log, status information, and information about scheduled and forwarded traffic that are generated at protocol layers (including an RRC layer, a PDCP layer, an SDAP layer, and the like) on the CU, train a model based on the collected data, generate a model instance by using the trained model, perform online prediction by using the model instance and the collected data, and execute a corresponding policy based on a prediction result, to dynamically adjust a configuration parameter of the CU based on the generated policy, thereby optimizing the CU. Because the data analysis apparatus is specially deployed for the CU, the data analysis apparatus has characteristics such as a short processing time and a fast processing speed, and can meet a requirement of the CU on a processing latency.

In the first application scenario, based on the network architecture shown in FIG. 1(a), the data analysis apparatus provided in this application may alternatively be deployed in the DU, and is mainly configured to: collect data such as a context, a log, status information, and information about scheduled and forwarded traffic that are generated at protocol layers (including an RLC layer, a MAC layer, and a PHY layer) on the DU, train a model based on the collected data, generate a model instance by using the trained model, perform online prediction by using the model instance and the collected data, and execute a corresponding policy based on a prediction result, to dynamically adjust a configuration parameter of the DU based on the generated policy, thereby optimizing the DU. Because the data analysis apparatus is specially deployed for the DU, the data analysis apparatus has characteristics such as a short processing time and a fast processing speed, and can meet a requirement of the DU on a processing latency. In this scenario, the DU has limited computing resources but can still complete model training.

In the second application scenario, based on the network architecture shown in FIG. 1(a), this application further provides a data analysis system. The data analysis system includes a first data analysis apparatus and a second data analysis apparatus. The first data analysis apparatus may be deployed in the CU, and the second data analysis apparatus may be deployed in the DU. The first data analysis apparatus completes model training, sends, to the second data apparatus, model information obtained after the model training, and delivers feature extraction information and policy information to the second data analysis apparatus. The second data analysis apparatus performs extraction, based on the feature extraction information, on data collected from the DU, generates a model instance by using the model information, performs prediction on extracted data by using the model instance to obtain a prediction result, selects a corresponding policy based on the prediction result and the policy information, and adjusts a configuration parameter of the DU based on the selected policy to quickly optimize the configuration parameter of the DU in real time, thereby optimizing the DU. Because model training is separated from model use, the DU with insufficient computing resources can also quickly adjust the configuration parameter of the DU in real time, so that performance of the DU can be improved.

Further, the first data analysis apparatus may further collect data from the CU, perform extraction on the collected data based on feature extraction information, complete model training based on extracted data to obtain model information, perform prediction on the extracted data based on the model information, select a corresponding policy based on a prediction result and policy information, and then adjust a configuration parameter of the CU based on the selected policy to quickly optimize the configuration parameter of the CU in real time.

Figure 1B:
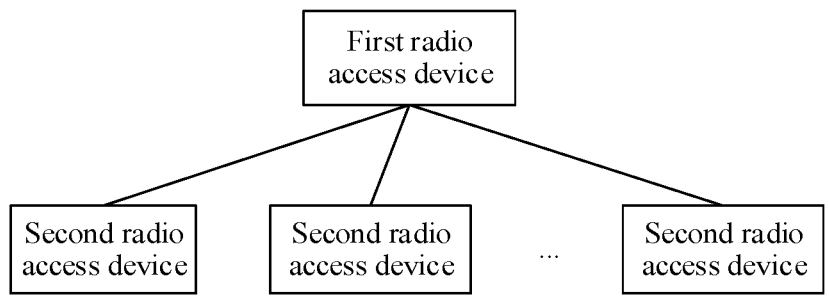
FIG. 1(b) is a schematic diagram of another possible network architecture according to this application.

FIG. 1(b) is a schematic diagram of another example network architecture to which this application is applicable. The network architecture includes a first radio access device and at least one second radio access device. The first radio access device has abundant computing resources, but the second radio access device usually has relatively limited computing resources due to factors such as a size and power consumption of the device.

For example, in an implementation, the first radio access device may be a large-capacity master next generation NodeB (master gNodeB), and the second radio access device is a single-site base station (for example, a NodeB, an evolved NodeB (eNodeB), or a gNodeB), or a slave next generation NodeB (slave gNodeB). Usually, one large-capacity NodeB may be connected to one or more single-site base stations.

Based on FIG. 1(b), various embodiments can provide corresponding apparatuses or systems for different application scenarios, to implement the data analysis method of this application.

In a first application scenario, the second radio access device has relatively limited computing resources but can still complete model training, and the CU has relatively abundant computing resources and also can complete model training. In a second application scenario, the second radio access device has relatively limited computing resources and cannot complete model training, and the first radio access device has relatively abundant computing resources and can complete model training.

In the first application scenario, based on the network architecture shown in FIG. 1(b), a data analysis apparatus provided in this application may be deployed in the first radio access device, and is mainly configured to: collect data such as a context, a log, status information, and information about scheduled and forwarded traffic that are generated at protocol layers (including an RRC layer, a PDCP layer, an SDAP layer, an RLC layer, a MAC layer, a PHY layer, and the like) on the first radio access device, train a model based on the collected data, generate a model instance by using the trained model, perform online prediction by using the model instance and the collected data, and execute a corresponding policy based on a prediction result, to dynamically adjust a configuration parameter of the first radio access device based on the generated policy, thereby optimizing the first radio access device. Because the data analysis apparatus is specially deployed for the first radio access device, the data analysis apparatus has characteristics such as a short processing time and a fast processing speed, and can meet a requirement of the first radio access device on a processing latency.

In the first application scenario, based on the network architecture shown in FIG. 1(b), the data analysis apparatus provided in this application may alternatively be deployed in the second radio access device, and is mainly configured to: collect data such as a context, a log, status information, and information about scheduled and forwarded traffic that are generated at protocol layers (including an RRC layer, a PDCP layer, an SDAP layer, an RLC layer, a MAC layer, a PHY layer, and the like) on the second radio access device, train a model based on the collected data, generate a model instance by using the trained model, perform online prediction by using the model instance and the collected data, and execute a corresponding policy based on a prediction result, to dynamically adjust a configuration parameter of the second radio access device based on the generated policy, thereby optimizing the second radio access device. Because the data analysis apparatus is specially deployed for the second radio access device, the data analysis apparatus has characteristics such as a short processing time and a fast processing speed, and can meet a requirement of the second radio access device on a processing latency. In this scenario, the second radio access device has limited computing resources but can still complete model training.

In the second application scenario, based on the network architecture shown in FIG. 1(b), this application further provides a data analysis system. The data analysis system includes a first data analysis apparatus and a second data analysis apparatus. The first data analysis apparatus may be deployed in the first radio access device, and the second data analysis apparatus may be deployed in the second radio access device. The first data analysis apparatus completes model training, sends, to the second data apparatus, model information obtained after the model training, and delivers feature extraction information and policy information to the second data analysis apparatus. The second data analysis apparatus performs extraction, based on the feature extraction information, on data collected from the second radio access device, generates a model instance by using the model information, performs prediction on extracted data by using the model instance to obtain a prediction result, selects a corresponding policy based on the prediction result and the policy information, and adjusts a configuration parameter of the second radio access device based on the selected policy to quickly optimize the configuration parameter of the second radio access device in real time, thereby optimizing the second radio access device. Because model training is separated from model use, the second radio access device with insufficient computing resources can also quickly adjust the configuration parameter of the second radio access device in real time, so that performance of the second radio access device can be improved.

Further, the first data analysis apparatus may further collect data from the first radio access device, performs extraction on the collected data based on feature extraction information, complete model training based on extracted data to obtain model information, perform prediction on the extracted data based on the model information, select a corresponding policy based on a prediction result and policy information, and then adjust a configuration parameter of the first radio access device based on the selected policy to quickly optimize the configuration parameter of the first radio access device in real time.

The following specifically describes, with reference to the accompanying drawings, the data analysis apparatus, system, and method provided in this application.

Figure 2:
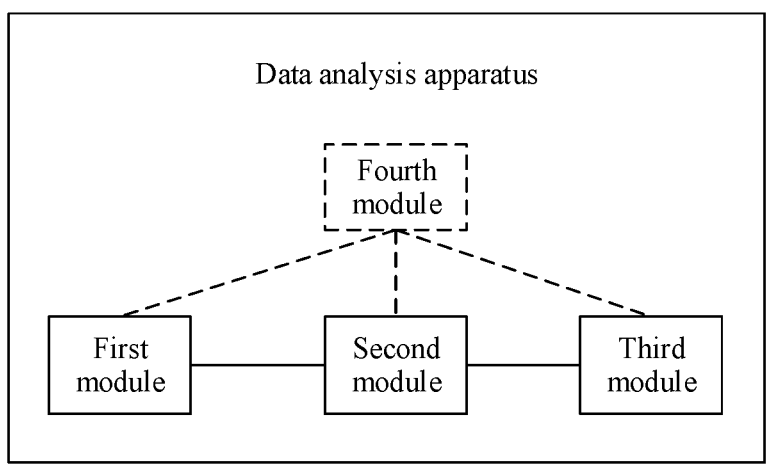
FIG. 2 is a schematic diagram of a data analysis apparatus according to this application.

FIG. 2 is a schematic diagram of a data analysis apparatus according to this application. The apparatus includes a first module, a second module, and a third module.

The data analysis apparatus may be deployed in at least one of the CU and the DU shown in FIG. 1(a), or may be deployed in at least one of the first radio access device and the second radio access device shown in FIG. 1(b).

The first module is configured to: obtain first feature extraction information, obtain first data of a network node based on the first feature extraction information, generate a first feature vector based on the first data and the first feature extraction information, and send the first feature vector.

The second module is configured to: obtain model information, and create a model instance based on the model information; and receive the first feature vector from the first module, generate a prediction result based on the first feature vector and the model instance, and send the prediction result.

The third module is configured to: obtain policy information, receive the prediction result from the second module, determine a configuration parameter value based on the prediction result and the policy information, and update a configuration parameter of the network node based on the configuration parameter value.

In some embodiments, the apparatus further includes a fourth module.

With reference to the specific embodiments, the following describes a method for performing data analysis by using the data analysis apparatus.

Implementation method 1: The data analysis apparatus includes the first module, the second module, the third module, and further includes the fourth module.

Figure 3:
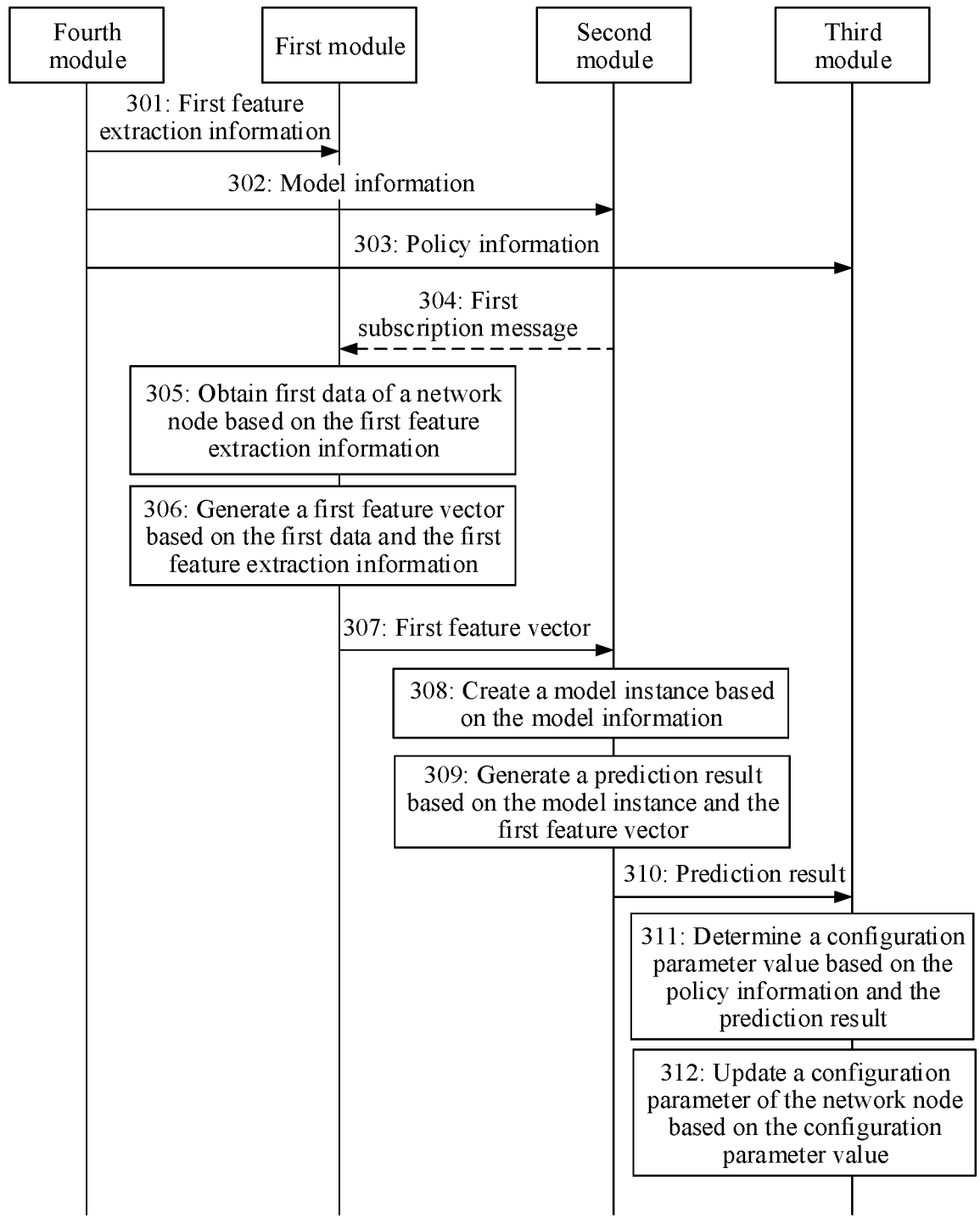
FIG. 3 is a schematic diagram of a data analysis method according to this application.

Based on the data analysis apparatus, this application provides a data analysis method. Referring to FIG. 3, the method includes the following steps.

Step 301: The fourth module sends first feature extraction information to the first module. Correspondingly, the first module receives the first feature extraction information from the fourth module.

Step 302: The fourth module sends model information to the second module. Correspondingly, the second module receives the model information from the fourth module.

Step 303: The fourth module sends policy information to the third module. Correspondingly, the third module receives the policy information from the fourth module.

It should be noted that an execution sequence of step 301, step 302, and step 303 is not limited, and may be arbitrary. For example, step 301, step 303, and step 302 are sequentially performed. For another example, step 302, step 303, and step 301 are sequentially performed. For another example, step 303, step 301, and step 302 are sequentially performed. Alternatively, step 301, step 302, and step 303 may be simultaneously performed.

Through step 301 to step 303, the fourth module respectively sends the first feature extraction information, the model information, and the policy information to the first module, the second module, and the third module.

The first feature extraction information, the model information, and the policy information each include a same model identifier, and the model identifier is used to identify a model instance.

Step 304: The second module sends a first subscription message to the first module. Correspondingly, the first module receives the first subscription message from the second module.

The first subscription message includes the model identifier.

For example, after receiving the model information sent by the fourth module, the second module obtains the model identifier from the model information, and then sends the first subscription message including the model identifier to the first module. The first subscription message is used to subscribe to, from the first module, a first feature vector corresponding to the model identifier.

Step 304 is an optional step. In actual application, this step may alternatively not be performed.

Step 305: The first module obtains first data of a network node based on the first feature extraction information.

The network node may be the CU or the DU shown in FIG. 1(*a*), or the network node may be the first radio access device or the second radio access device shown in FIG. 1(*b*).

For example, if the data analysis apparatus shown in FIG. 3 is deployed in the CU shown in FIG. 1(*a*), the network node is the CU. In other words, the data analysis apparatus obtains the first data from the CU based on the first feature extraction information.

For another example, if the data analysis apparatus shown in FIG. 3 is deployed in the DU shown in FIG. 1(*a*), the network node is the DU. In other words, the data analysis apparatus obtains the first data from the DU based on the first feature extraction information.

For another example, if the data analysis apparatus shown in FIG. 3 is deployed in the first radio access device shown in FIG. 1(*b*), the network node is the first radio access device. In other words, the data analysis apparatus obtains the first data from the first radio access device based on the first feature extraction information.

For another example, if the data analysis apparatus shown in FIG. 3 is deployed in the second radio access device shown in FIG. 1(*b*), the network node is the second radio access device. In other words, the data analysis apparatus obtains the first data from the second radio access device based on the first feature extraction information.

After receiving the first subscription message, the first module obtains the model identifier from the first subscription message, and determines the corresponding first feature extraction information based on the model identifier. Specifically, the first feature extraction information obtained by the first module also includes the model identifier. It may also be understood as that the model identifier may be used by the first module to obtain the first data by using the first feature extraction information corresponding to the model identifier.

In an implementation, the first feature extraction information includes input data parameter information, and the input data parameter information is used to indicate to collect the first data. It may also be understood as that the input data parameter information indicates the first data that needs to be obtained, and a manner in which the data analysis apparatus obtains the first data from the network node may be: obtaining the corresponding first data based on the input data parameter information.

For example, the input data parameter information may include some or all of the following information:

a. an identifier of collected original data, where for example, the identifier may be used to identify information such as a signal-to-noise ratio, signal strength measurement, or a user service data packet;

b. a sampling manner, for example, including timing sampling, event-triggered sampling, or traffic sampling;

c. a total amount of sampled data;

d. a valid value range of data;

e. a padding value of missing or invalid data;

f. data type conversion, for example, converting text information into numerical information.

Therefore, the first module can obtain the first data from the collected original data of the network node based on the foregoing information in the input data parameter information.

Step 306: The first module generates the first feature vector based on the first feature extraction information and the first data.

In an implementation, the first feature extraction information further includes feature processing information and output feature vector information, the feature processing information is used to indicate a processing manner of converting the first data into the first feature vector, and the output feature vector information is used to indicate a format of the sent first feature vector. The format of the first feature vector may be a value range, a data mapping rule, a data transformation function, or the like. The output feature vector information may alternatively indicate to directly use a feature processing result as the first feature vector.

In an example, the feature processing information may include one or more pieces of feature extraction component information, and each piece of feature extraction component information may include some or all of the following information:

a. a processing manner, for example, including feature transformation, normalization, feature smoothing, standardization, and parameter dimension reduction; and b. feature extraction component parameter information, which for example, includes a coefficient value, a function (for example, a summation function, a difference function, an average function, a variance function, a logarithm function, a maximum/minimum function, or a Gaussian average function), and may further include an identifier of a feature extraction component template and configuration parameter information of the feature extraction component template that are preset on the first module, and the configuration parameter information may be used to set a range of a feature extraction parameter.

If the feature processing information includes a plurality of pieces of feature extraction component information, processing on the first data needs to be performed in sequence. The sequence may be an arrangement sequence of the feature extraction component information in the feature processing information, or a processing sequence of each piece of feature extraction component information may be independently identified in the feature processing information.

In this way, the first module may process the first data based on the feature processing information, to obtain the processed first data.

Then, the first module processes the processed first data based on the output feature vector information, to obtain the first feature vector.

Step 307: The first module sends the first feature vector to the second module, and the second module receives the first feature vector from the first module.

Step 308: The second module creates a model instance based on the model information.

In an implementation, the model instance includes the model identifier and model description information, and the model description information is used to indicate parameter information corresponding to the model instance.

The model instance may be understood as an instance of a trained model, and may be directly used for data analysis. Therefore, the second module does not need to train a model, and only needs to create the model instance based on the model information, and perform data analysis by using the model instance. Therefore, a speed of performing data analysis by the second module can be improved.

In an example, the model description information includes complete information of a trained model (for example, a machine learning model). When the second module creates the model instance based on the model description information, the model instance may have a characteristic of the trained model. For example, after a logistic regression machine learning model is trained, the model information includes topology information (for example, a topology node and a connection manner), parameter information (for example, a parameter identifier and a parameter value) of the topology node, and the like. After the model information is delivered to the second module, the second module can create a logistic regression model instance, which can reproduce a characteristic of the model. To be specific, if feature vectors input into two models are the same, prediction results of the two models are also the same.

It should be noted that step 308 is not limited to being performed after step 307, and may be performed at any moment between step 302 and step 308. For example, step 308 may be performed after step 302 and before step 303, or performed after step 303 and before step 304, or performed after step 304 and before step 305, and so on.

In another implementation, step 302 and step 308 may be combined into one step, that is, step 308 is performed while step 302 is performed.

Step 309: The second module generates a prediction result based on the model instance and the first feature vector.

For example, the second module uses the first feature vector as an input parameter, and inputs the first feature vector into the model instance to perform an operation, to obtain the prediction result.

Step 310: The second module sends the prediction result to the third module. Correspondingly, the third module receives the prediction result from the second module.

Step 311: The third module determines a configuration parameter value based on the policy information and the prediction result.

In an implementation, the policy information includes the model identifier, configuration parameter information, and prediction result information.

The configuration parameter information is used to indicate a configuration parameter, and the prediction result information is used to indicate a mapping relationship between the configuration parameter value of the configuration parameter and the prediction result.

In an example, the configuration parameter information may include a parameter identifier of a network function or performance of the network node whose configuration parameter needs to be adjusted, for example, a maximum bandwidth, a scheduling queue depth, a scheduling priority, pilot transmit power, an antenna elevation angle, and a multi-antenna scheduling setting. The configuration parameter information may further include configuration parameter value information, and the configuration parameter value information is content of the configuration parameter, for example, may be a numeric value, an enumerated value, or a boolean.

The prediction result information may include the mapping relationship between the prediction result and the configuration parameter value, or may include an algorithm, a formula, a function, or the like for generating the configuration parameter value based on the prediction result.

Therefore, one or more configuration parameter values may be obtained based on the policy information and the prediction result that is generated by the second module, and the configuration parameter value may be used to adjust the configuration parameter of the network node.

Step 312: The third module updates the configuration parameter of the network node based on the configuration parameter value.

The third module updates the configuration parameter of the network node based on the generated configuration parameter value, to complete real-time adjustment of the configuration parameter of the network node, thereby optimizing the configuration parameter.

The data analysis apparatus may collect data of a network node in a mobile access network, and then perform data analysis and adjust a configuration parameter of the network node, to implement targeted data analysis and parameter adjustment for the network node, so that a speed of data analysis and configuration parameter adjustment can be improved. In addition, the modules may run in parallel, so that the speed of data analysis and configuration parameter adjustment can be further improved.

Further, in an implementation, before step 301, the method further includes the following model training process. The model training process is used to train a model, to obtain the model information used by the second module in the embodiment shown in FIG. 3. Specifically, the second module may create the model instance based on the model information, and generate the prediction result based on the model instance.

Figure 4:
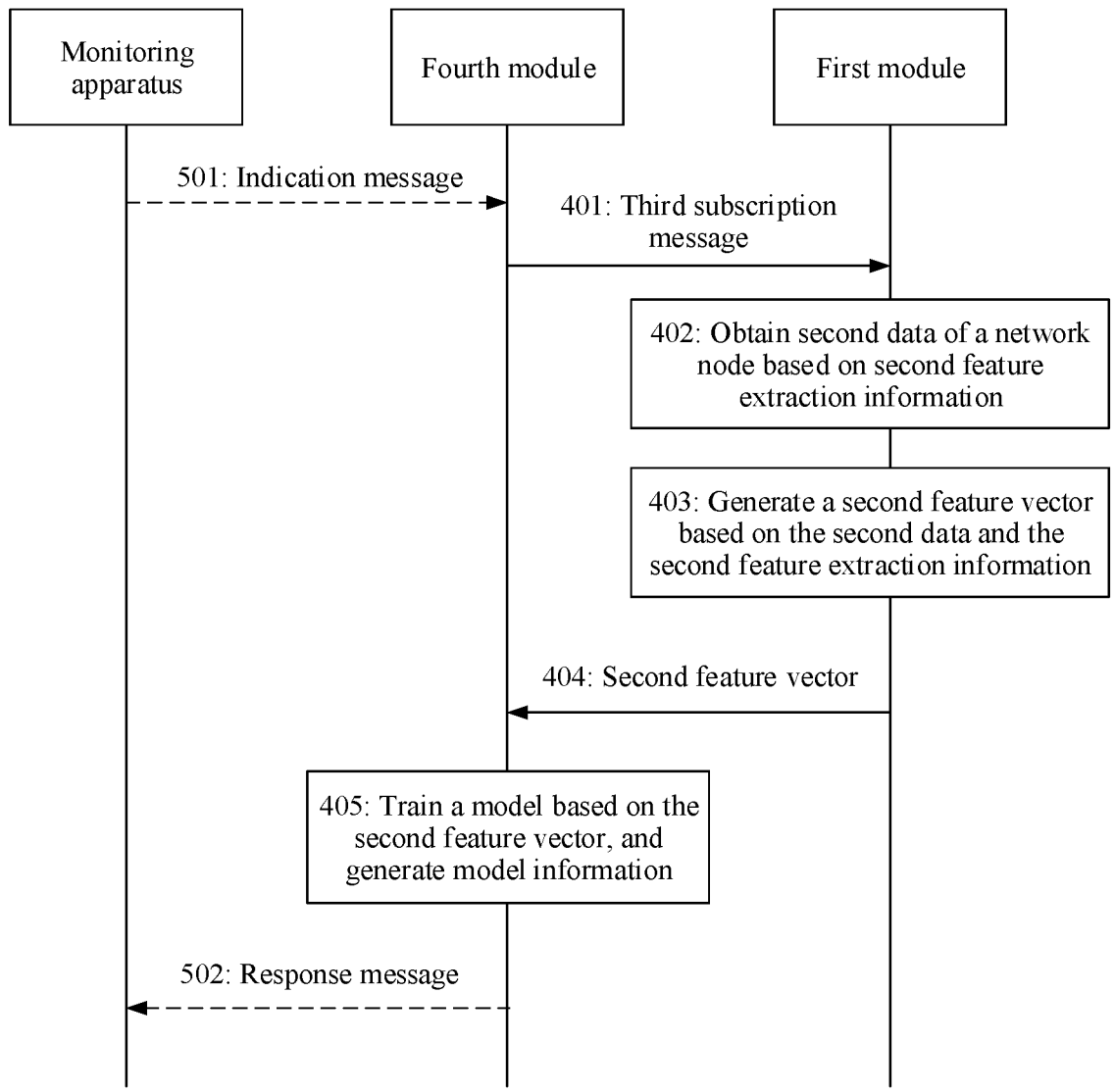
FIG. 4 is a schematic diagram of another data analysis method according to this application.

FIG. 4 shows another data analysis method according to this application. The data analysis method mainly includes a model training process. The model training process includes the following steps.

Step 401: The fourth module sends a third subscription message to the first module. Correspondingly, the first module receives the third subscription message from the fourth module.

The third subscription message includes second feature extraction information.

Step 402: The first module obtains second data of a network node based on the second feature extraction information.

In an implementation, a manner in which the data analysis apparatus obtains the second data from the network node, for example, may be: The second feature extraction information includes input data parameter information, and the input data parameter information is used to indicate to collect the second data. It may also be understood as that the input data parameter information indicates the second data that needs to be obtained, so that the data analysis apparatus can obtain the corresponding second data based on the input data parameter information.

For example, the input data parameter information may include some or all of the following information:

a. an identifier of collected original data, where for example, the identifier may be used to identify information such as a signal-to-noise ratio, signal strength measurement, or a user service data packet;

b. a sampling manner, for example, including timing sampling, event-triggered sampling, or traffic sampling;

c. a total amount of sampled data;

d. a valid value range of data;

e. a padding value of missing or invalid data;

f data type conversion, for example, converting text information into numerical information.

Therefore, the first module can obtain the second data from the collected original data of the network node based on the foregoing information in the input data parameter information.

Step 403: The first module generates a second feature vector based on the second data and the second feature extraction information.

In an implementation, the second feature extraction information further includes feature processing information and output feature vector information, the feature processing information is used to indicate a processing manner of converting the second data into the second feature vector, and the output feature vector information is used to indicate a format of the sent second feature vector.

In an example, the feature processing information may include one or more pieces of feature extraction component information, and each piece of feature extraction component information may include some or all of the following information:

a. a processing manner, for example, including feature transformation, normalization, feature smoothing, standardization, and parameter dimension reduction; and b. feature extraction component parameter information, which for example, includes a coefficient value, a function (for example, a summation function, a difference function, an average function, a variance function, a logarithm function, a maximum/minimum function, or a Gaussian average function), and may further include an identifier of a feature extraction component template and configuration parameter information of the feature extraction component template that are preset on the first module, and the configuration parameter information may be used to set a range of a feature extraction parameter.

If the feature processing information includes a plurality of pieces of feature extraction component information, processing on the second data needs to be performed in sequence. The sequence may be an arrangement sequence of the feature extraction component information in the feature processing information, or a processing sequence of each piece of feature extraction component information may be independently identified in the feature processing information.

In this way, the first module may process the second data based on the feature processing information, to obtain the processed second data.

Then, the first module processes the processed second data based on the output feature vector information, to obtain the second feature vector.

Step 404: The first module sends the second feature vector to the fourth module. Correspondingly, the fourth module receives the second feature vector from the first module.

Step 405: The fourth module trains a model based on the second feature vector, and generates model information.

For example, the fourth module uses the second feature vector as an input parameter, and inputs the second feature vector into the to-be-trained model, to obtain the model information after the model training is completed. The model information is the model information used by the second module to create the model instance in the embodiment shown in FIG. 3.

It should be noted that the second feature vector obtained by the first module in the embodiment shown in FIG. 4 is used by the fourth module to perform model training, and the first feature vector obtained by the first module in the embodiment shown in FIG. 3 is used by the second module as input of the model instance, to obtain the prediction result.

According to the foregoing method, the fourth module performs model training to obtain the model information, and sends the model to the second module. The second module creates the model instance based on the model information. In the method, model training is separated from model use. To be specific, the fourth module performs model training, and the second module uses the model. The two modules may run in parallel, so that a data analysis speed of the data processing apparatus can be improved.

In an implementation, before step 401, the method further includes the following step:

Step 501: A monitoring apparatus sends an indication message to the fourth module. Correspondingly, the fourth module receives the indication message from the monitoring apparatus.

The indication message includes a model type of the model, and the model type corresponds to the foregoing model information. The indication message is used to indicate to create the model and start training of the model.

It may also be understood as that the monitoring apparatus may be configured to: trigger the fourth module to perform model training, and send the indication message including the type of the to-be-trained model to the fourth module. Therefore, the fourth module may complete model training based on indication of the monitoring apparatus. In this way, an external monitoring apparatus is used to trigger the fourth module of the data analysis apparatus to create and train the model. This helps control the data analysis apparatus.

In some embodiments, the indication message may further include first feature extraction information and policy information, and the first feature extraction information and the policy information are the first feature extraction information and the policy information used in the embodiment shown in FIG. 3. That is, the first feature extraction information and the policy information that are used by the data analysis apparatus may be from the monitoring apparatus.

Further, if step 501 is performed before step 401 in the embodiment shown in FIG. 4, in some embodiments, after step 405 is performed in the embodiment shown in FIG. 4, the following step may be further performed:

Step 502: The fourth module sends a response message to the monitoring apparatus, and the monitoring apparatus receives the response message from the fourth module.

If the fourth module completes training, the response message is used to indicate that the training of the model is completed.

If the fourth module does not complete training, for example, the training fails, the response message is used to indicate that the model training fails.

Therefore, the monitoring apparatus can better control the data analysis apparatus.

The foregoing embodiment shown in FIG. 4 provides the method for obtaining the model information. To be specific, the fourth module completes model training to obtain the model information, and sends the model information to the second module for use.

In another implementation, the embodiment shown in FIG. 4 may be not performed. In other words, step 401 to step 405 are not performed, or step 501, step 401 to step 405, and step 502 are not performed. Instead, the fourth module obtains the model information in another manner. For example, another data analysis apparatus or the monitoring apparatus may complete model training and obtain the model information, and then send the model information to the fourth module. Then, the fourth module sends the obtained model information to the second module.

Figure 5:
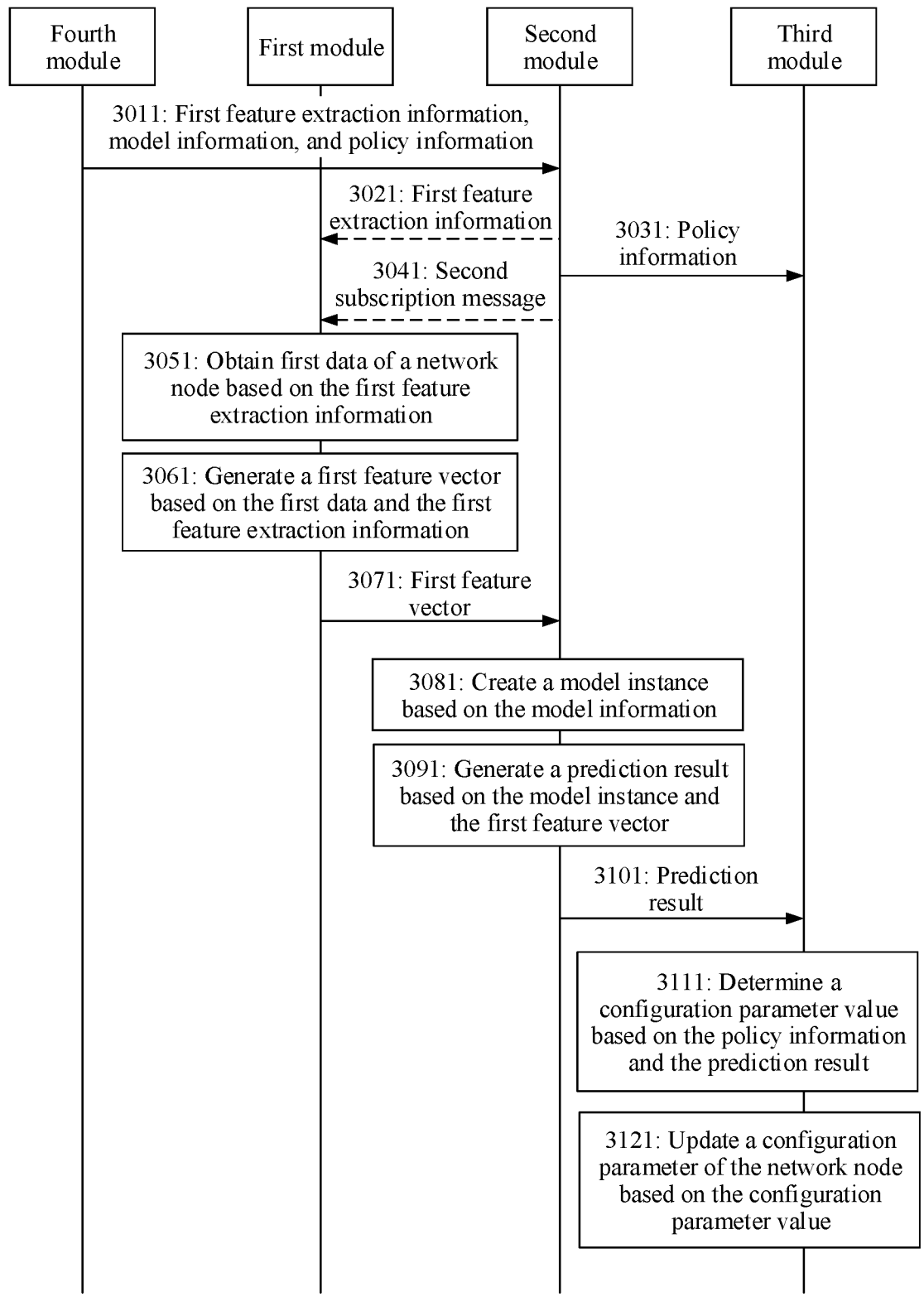
FIG. 5 is a schematic diagram of another data analysis method according to this application.

In another implementation, step 301 to step 304 in Embodiment 3 may be replaced with step 3011 to step 3041. FIG. 5 is a schematic diagram of another data analysis method according to this application. The method includes the following steps.

Step 3011: The fourth module sends first feature extraction information, model information, and policy information to the second module. Correspondingly, the second module receives the first feature extraction information, the model information, and the policy information that are sent by the fourth module.

The first feature extraction information, the model information, and the policy information each include a same model identifier, and the model identifier is used to identify a model instance.

Step 3021: The second module sends the first feature extraction information to the first module. Correspondingly, the first module receives the first feature extraction information sent by the second module.

Step 3031: The second module sends the policy information to the third module. Correspondingly, the third module receives the policy information sent by the second module.

An execution sequence of step 3021 and step 3031 is not limited.

Step 3041: The second module sends a second subscription message to the first module. Correspondingly, the first module receives the second subscription message sent by the second module.

In an implementation, after receiving the first feature extraction information, the model information, and the policy information, the second module may obtain the model identifier from the first feature extraction information, the model information, or the policy information, and then send the second subscription message including the model identifier to the first module. The second subscription message is used to subscribe to, from the first module, a first feature vector corresponding to the model identifier.

In another implementation, the second module sends the second subscription message including the first feature extraction information to the first module. The second subscription message is used to subscribe to, from the first module, a first feature vector corresponding to the model identifier. In this implementation, step 3021 does not need to be performed.

Step 3051 to step 3121 are the same as step 305 to step 312 in the embodiment shown in FIG. 3. Reference may be made to the foregoing descriptions. Details are not described herein again.

It should be noted that the embodiment shown in FIG. 4 may also be combined with the embodiment shown in FIG. 5. That is, the embodiment shown in FIG. 4 may be performed before step 3011 in the embodiment shown in FIG. 5. For a specific implementation process, refer to the foregoing descriptions. Details are not described herein again.

Implementation method 2: The data analysis apparatus includes the first module, the second module, and the third module.

In the implementation method, the data analysis apparatus does not include the fourth module, and an external data analysis apparatus (which for example, may be referred to as a target data analysis apparatus) may collect the data of the foregoing data analysis apparatus, perform model training to obtain the model information, and send the first feature extraction information, the model information, and the policy information to the foregoing data analysis apparatus to be respectively used by the first module, the second module, and the third module in the foregoing data analysis apparatus.

In an example implementation procedure, the "fourth module" in the foregoing implementation method 1 may be replaced with the "another data analysis apparatus".

With reference to FIG. 1(a) and FIG. 1(b), the following describes a specific deployment manner of the data analysis apparatus provided above.

In the foregoing implementation method 1, the data analysis apparatus includes the first module, the second module, the third module, and the fourth module. In some embodiments, the fourth module may be configured to train the model.

With reference to the network architecture shown in FIG. 1(a), in an implementation, if the data analysis apparatus does not have a model training function, the data analysis apparatus may be deployed in the DU, and the CU completes model training.

In another implementation, if the data analysis apparatus has a model training function, and the computing resources of the DU are sufficient to complete model training, the data analysis apparatus may be deployed in the DU. Further, the data analysis apparatus may alternatively be deployed in the CU.

With reference to the network architecture shown in FIG. 1(b), in an implementation, if the data analysis apparatus does not have a model training function, the data analysis apparatus may be deployed in the second radio access device, and the first radio access device completes model training.

In another implementation, if the data analysis apparatus has a model training function, and the computing resources of the second radio access device are sufficient to complete model training, the data analysis apparatus may be deployed in the second radio access device. Further, the data analysis apparatus may alternatively be deployed in the first radio access device.

In the foregoing implementation method 2, the data analysis apparatus includes the first module, the second module, and the third module. The data analysis apparatus does not have the model training function.

With reference to the network architecture shown in FIG. 1(a), in an implementation, the data analysis apparatus may be deployed in the DU, and the CU completes model training.

With reference to the network architecture shown in FIG. 1(b), in an implementation, the data analysis apparatus may be deployed in the second radio access device, and the first radio access device completes model training.

Figure 6:
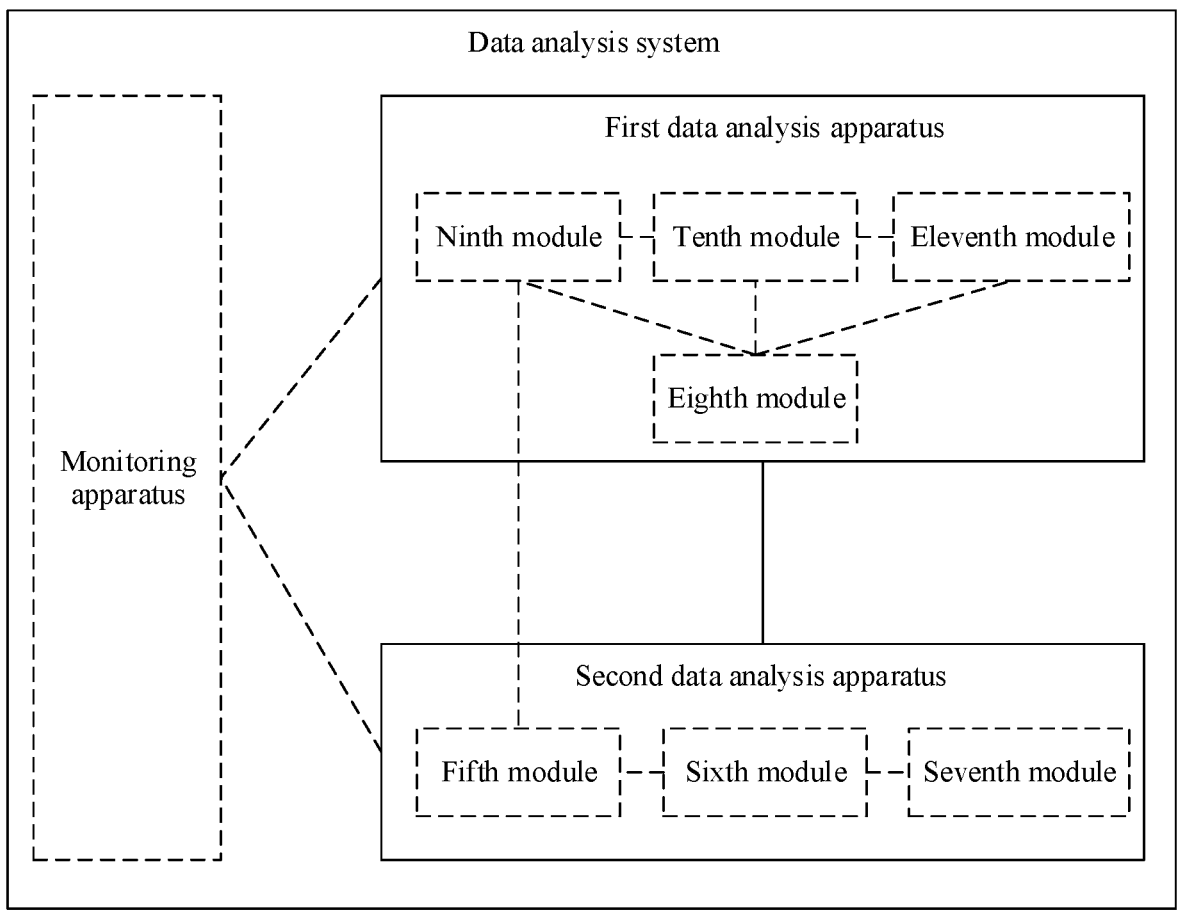
FIG. 6 is a schematic diagram of a data analysis system according to this application.

FIG. 6 shows a data analysis system according to this application. The system includes a first data analysis apparatus and a second data analysis apparatus. In some embodiments, the system further includes a monitoring apparatus.

The first data analysis apparatus is configured to send first feature extraction information, model information, and policy information.

The second data analysis apparatus is configured to: receive the first feature extraction information, the model information, and the policy information from the first data analysis apparatus; obtain first data of a network node based on the first feature extraction information, and generate a first feature vector based on the first data and the first feature extraction information; create a model instance based on the model information; generate a prediction result based on the first feature vector and the model instance; and determine a configuration parameter value based on the prediction result and the policy information, and update a configuration parameter of the network node based on the configuration parameter value.

According to the data analysis system, after receiving the first feature extraction information, the model information, and the policy information that are sent by the first data analysis apparatus, the second data analysis apparatus may collect data of a network node in a mobile access network, and then perform data analysis and adjust a configuration parameter of the network node, to implement targeted data analysis and parameter adjustment for the network node, so that a speed of data analysis and configuration parameter adjustment can be improved.

With reference to the accompanying drawings, the following specifically describes a method for performing data analysis by using the data analysis system provided in this application.

Figure 7:
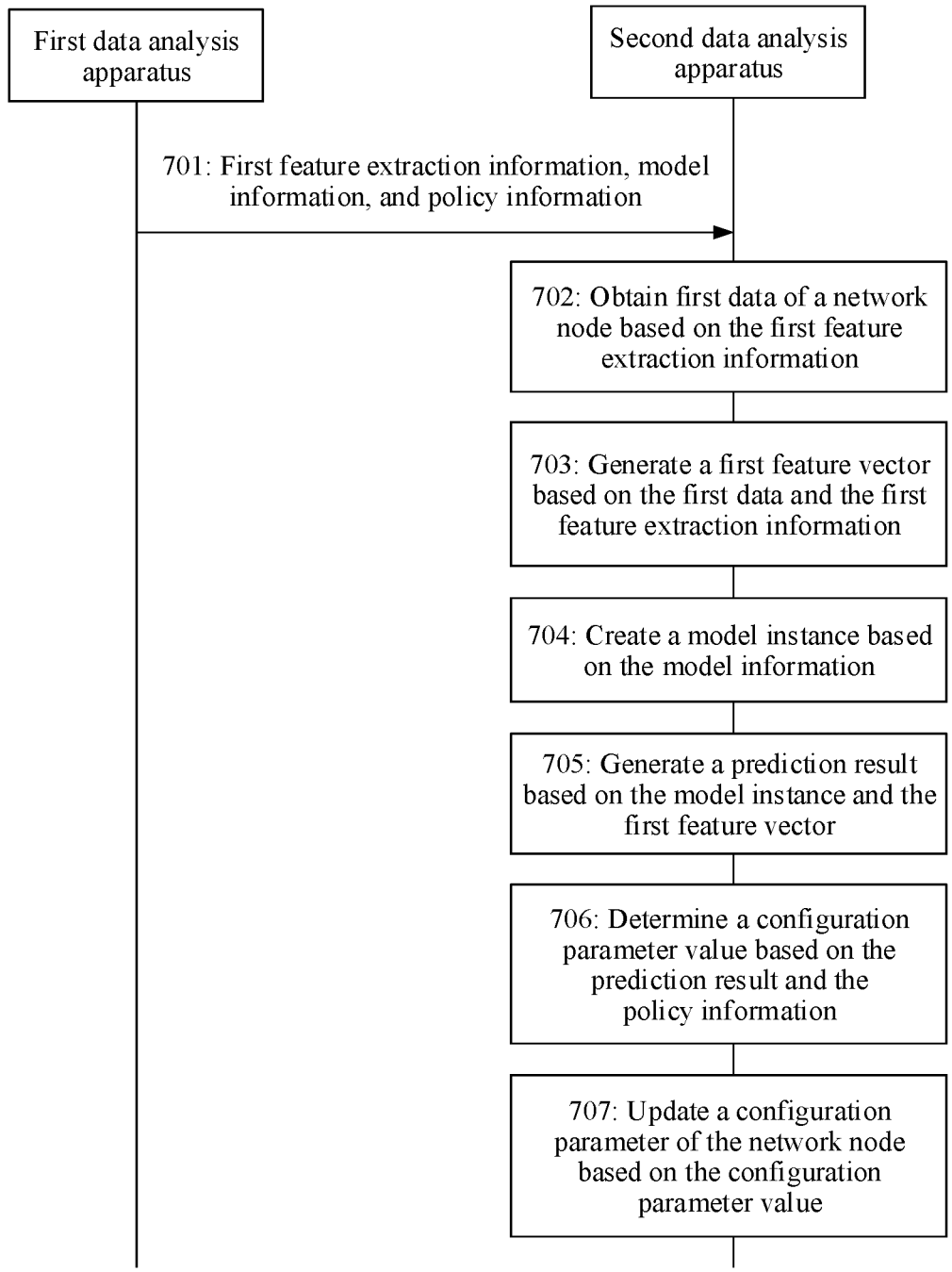
FIG. 7 is a schematic diagram of another data analysis method according to this application.

FIG. 7 is a schematic diagram of a data analysis method according to this application. The method includes the following steps.

Step 701: The first data analysis apparatus sends first feature extraction information, model information, and policy information to the second data analysis apparatus. Correspondingly, the second data analysis apparatus receives the first feature extraction information, the model information, and the policy information from the first data analysis apparatus.

Step 702: The second data analysis apparatus obtains first data of a network node based on the first feature extraction information.

A method for obtaining the first data of the network node by the second data analysis apparatus in this step is similar to the method for obtaining the first data of the network node by the first module in step 305 in the embodiment shown in FIG. 3. Reference may be made to the foregoing descriptions. Details are not described herein again.

Step 703: The second data analysis apparatus generates a first feature vector based on the first data and the first feature extraction information.

A method for generating the first feature vector by the second data analysis apparatus in this step is similar to the method for generating the first feature vector by the first module in step 306 in the embodiment shown in FIG. 3. Reference may be made to the foregoing descriptions. Details are not described herein again.

Step 704: The second data analysis apparatus creates a model instance based on the model information.

A method for creating the model instance by the second data analysis apparatus in this step is similar to the method for creating the model instance by the second module in step 308 in the embodiment shown in FIG. 3. Reference may be made to the foregoing descriptions. Details are not described herein again.

Step 705: The second data analysis apparatus generates a prediction result based on the model instance and the first feature vector.

A method for generating the prediction result by the second data analysis apparatus in this step is similar to the method for generating the prediction result by the second module in step 309 in the embodiment shown in FIG. 3. Reference may be made to the foregoing descriptions. Details are not described herein again.

Step 706: The second data analysis apparatus determines a configuration parameter value based on the prediction result and the policy information.

A method for determining the configuration parameter value by the second data analysis apparatus in this step is similar to the method for determining the configuration parameter value by the third module in step 311 in the embodiment shown in FIG. 3. Reference may be made to the foregoing descriptions. Details are not described herein again.

Step 707: The second data analysis apparatus updates a configuration parameter of the network node based on the configuration parameter value.

A method for updating the configuration parameter of the network node by the second data analysis apparatus in this step is similar to the method for updating the configuration parameter of the network node by the third module in step 312 in the embodiment shown in FIG. 3. Reference may be made to the foregoing descriptions. Details are not described herein again.

Further, in an implementation, before step 701, the method may further include the following model training process. The model training process is used to train a model, to obtain the model information used by the second data analysis apparatus in the embodiment shown in FIG. 6. Specifically, the second data analysis apparatus may create the model instance based on the model information, and generate the prediction result based on the model instance.

Figure 8:
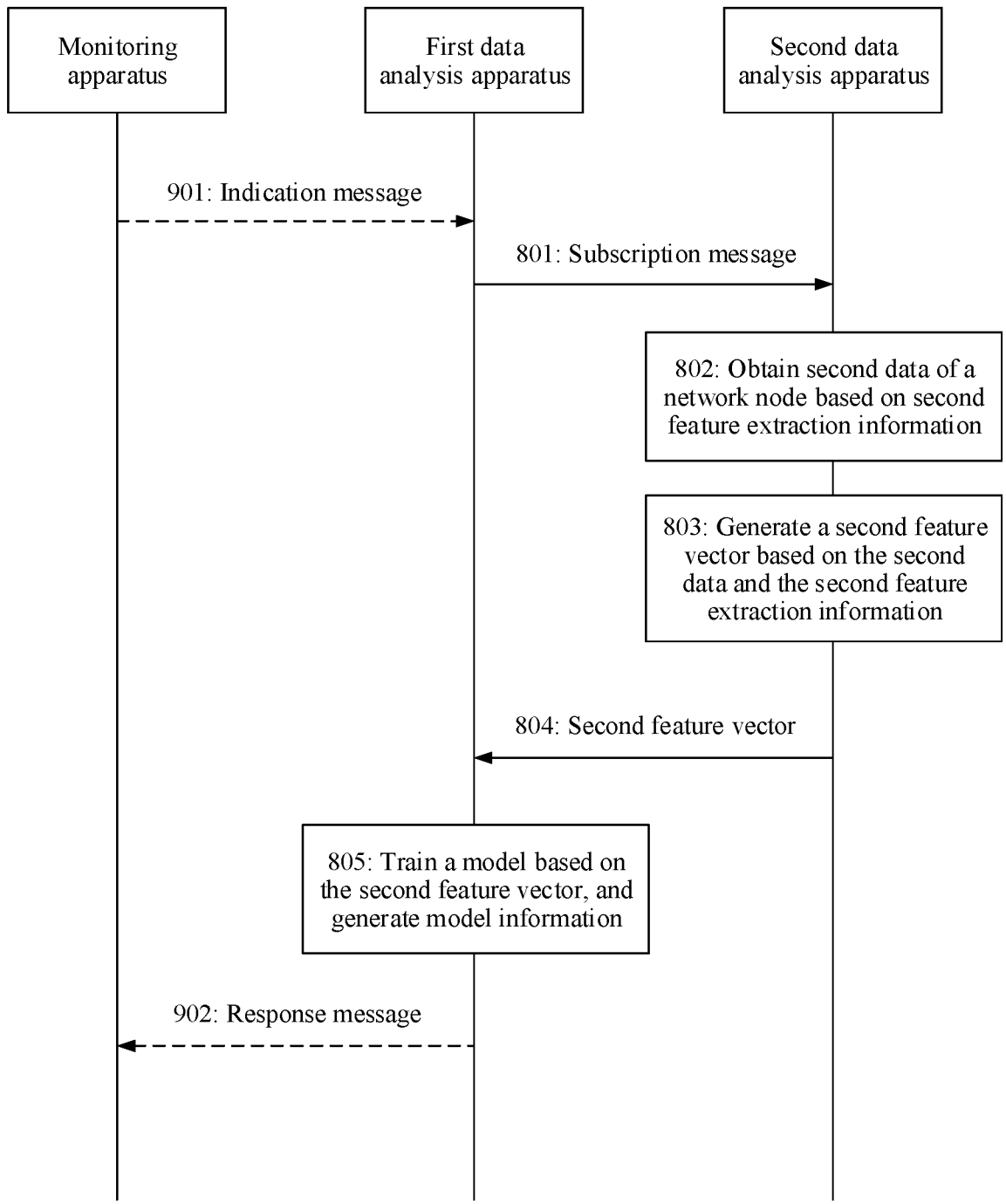
FIG. 8 is a schematic diagram of another data analysis method according to this application.

Model training may be completed by the first data analysis apparatus. FIG. 8 shows another data analysis method according to this application. The data analysis method mainly includes a model training process. The model training process includes the following steps.

Step 801: The first data analysis apparatus sends a subscription message to the second data analysis apparatus. Correspondingly, the second data analysis apparatus receives the subscription message from the first data analysis apparatus.

The subscription message includes second feature extraction information.

Step 802: The second data analysis apparatus obtains second data of a network node based on the second feature extraction information.

A method for obtaining the second data of the network node by the second data analysis apparatus in this step is similar to the method for obtaining the second data of the network node by the first module in step 402 in the embodiment shown in FIG. 4. Reference may be made to the foregoing descriptions. Details are not described herein again.

Step 803: The second data analysis apparatus generates a second feature vector based on the second data and the second feature extraction information.

A method for generating the second feature vector by the second data analysis apparatus in this step is similar to the method for generating the second feature vector by the first module in step 403 in the embodiment shown in FIG. 4. Reference may be made to the foregoing descriptions. Details are not described herein again.

Step 804: The second data analysis apparatus sends the second feature vector to the first data analysis apparatus. Correspondingly, the first data analysis apparatus receives the second feature vector from the second data analysis apparatus.

Step 805: The first data analysis apparatus trains a model based on the second feature vector, and generates model information.

A method for training the model based on the second feature vector and generating the model information by the second data analysis apparatus in this step is similar to the method for training the model based on the second feature vector and generating the model information by the fourth module in step 405 in the embodiment shown in FIG. 4. Reference may be made to the foregoing descriptions. Details are not described herein again.

It should be noted that the second feature vector obtained by the second data analysis apparatus in the embodiment shown in FIG. 8 is used by the first data analysis apparatus to perform model training, and the first feature vector obtained by the second data analysis apparatus in the embodiment shown in FIG. 7 is used by the second data analysis apparatus as input of the model instance, to obtain the prediction result.

According to the foregoing method, the first data analysis apparatus performs model training to obtain the model information, and sends the model to the second data analysis apparatus. The second data analysis apparatus creates the model instance based on the model information. In the method, model training is separated from model use. To be specific, the first data analysis apparatus performs model training, and the second data analysis apparatus uses the model. The two data analysis apparatuses may run in parallel, so that a data analysis speed of the data processing apparatus can be improved.

In an implementation, before step 801, the method further includes the following step:

Step 901: A monitoring apparatus sends an indication message to the first data analysis apparatus. Correspondingly, the first data analysis apparatus receives the indication message from the monitoring apparatus.

The indication message includes a model type of the model, and the model type corresponds to the foregoing model information. The indication message is used to indicate to create the model and start training of the model.

It may also be understood as that the monitoring apparatus may be configured to: trigger the first data analysis apparatus to perform model training, and send the indication message including the type of the to-be-trained model to the first data analysis apparatus. Therefore, the first data analysis apparatus may complete model training based on indication of the monitoring apparatus. In this way, an external monitoring apparatus is used to trigger the first data analysis apparatus in the data analysis apparatuses to create and train the model. This helps control the first data analysis apparatus.

In some embodiments, the indication message may further include first feature extraction information and policy information, and the first feature extraction information and the policy information are the first feature extraction information and the policy information used in the embodiment shown in FIG. 7. That is, the first feature extraction information and the policy information that are used by the second data analysis apparatus may be from the monitoring apparatus.

Further, if step 901 is performed before step 801 in the embodiment shown in FIG. 8, in some embodiments, after step 805 is performed in the embodiment shown in FIG. 8, the following step may be further performed:

Step 902: The first data analysis apparatus sends a response message to the monitoring apparatus, and the monitoring apparatus receives the response message from the first data analysis apparatus.

If the first data analysis apparatus completes training, the response message is used to indicate that the training of the model is completed.

If the first data analysis apparatus does not complete training, for example, the training fails, the response message is used to indicate that the model training fails.

Therefore, the monitoring apparatus can better control the first data analysis apparatus.

The foregoing embodiment shown in FIG. 8 provides the method for obtaining the model information. To be specific, the first data analysis apparatus completes model training to obtain the model information, and sends the model information to the second data analysis apparatus for use.

In another implementation, the embodiment shown in FIG. 8 may be not performed. In other words, step 801 to step 805 are not performed, or step 901, step 801 to step 805, and step 902 are not performed. Instead, the first data analysis apparatus obtains the model information in another manner. For example, another data analysis apparatus or the monitoring apparatus may complete model training and obtain the model information, and then send the model information to the first data analysis apparatus. Then, the first data analysis apparatus may send the obtained model information to the second data analysis apparatus.

The data analysis system shown in FIG. 6 is mainly applied to an application scenario in which model training cannot be completed by the DU or the second radio access device due to insufficient computing resources.

In this scenario, based on the network architecture shown in FIG. 1(*a*), the first data analysis apparatus may be deployed in the CU, the second data analysis apparatus may be deployed in the DU, and the network node is the DU. The first data analysis apparatus completes model training and obtains the model information. The second data analysis apparatus creates the model instance based on the model information, and performs prediction based on the model instance to analyze the collected data of the DU, to update and optimize a configuration parameter of the DU.

In this scenario, based on the network architecture shown in FIG. 1(*b*), the first data analysis apparatus may be deployed in the first radio access device, the second data analysis apparatus may be deployed in the second radio access device, and the network node is the second radio access device. The first data analysis apparatus completes model training and obtains the model information. The second data analysis apparatus creates the model instance based on the model information, and performs prediction based on the model instance to analyze the collected data of the second radio access device, to update and optimize a configuration parameter of the second radio access device.

For example, the following provides example implementations of the first data analysis apparatus and the second data analysis apparatus. For example, referring to FIG. 6, the first data analysis apparatus includes an eighth module and a ninth module. In some embodiments, the first data analysis apparatus further includes a tenth module and an eleventh module. The second data analysis apparatus includes a fifth module, a sixth module, and a seventh module.

The eighth module may be configured to perform step 701 in the embodiment shown in FIG. 7. Further, the eighth module may be further configured to perform step 805 in the embodiment shown in FIG. 8. Further, the eighth module may be further configured to perform step 901 and step 902 in the embodiment shown in FIG. 8. The ninth module may be configured to perform step 801 and step 804 in the embodiment shown in FIG. 8.

The fifth module may be configured to perform step 702 and step 703 in the embodiment shown in FIG. 7. Further, the fifth module may be further configured to perform step 801 to step 804 in the embodiment shown in FIG. 8. The sixth module may be configured to perform step 704 and step 705 in the embodiment shown in FIG. 7. The seventh module may be configured to perform step 706 and step 707 in the embodiment shown in FIG. 7.

Figure 9A:
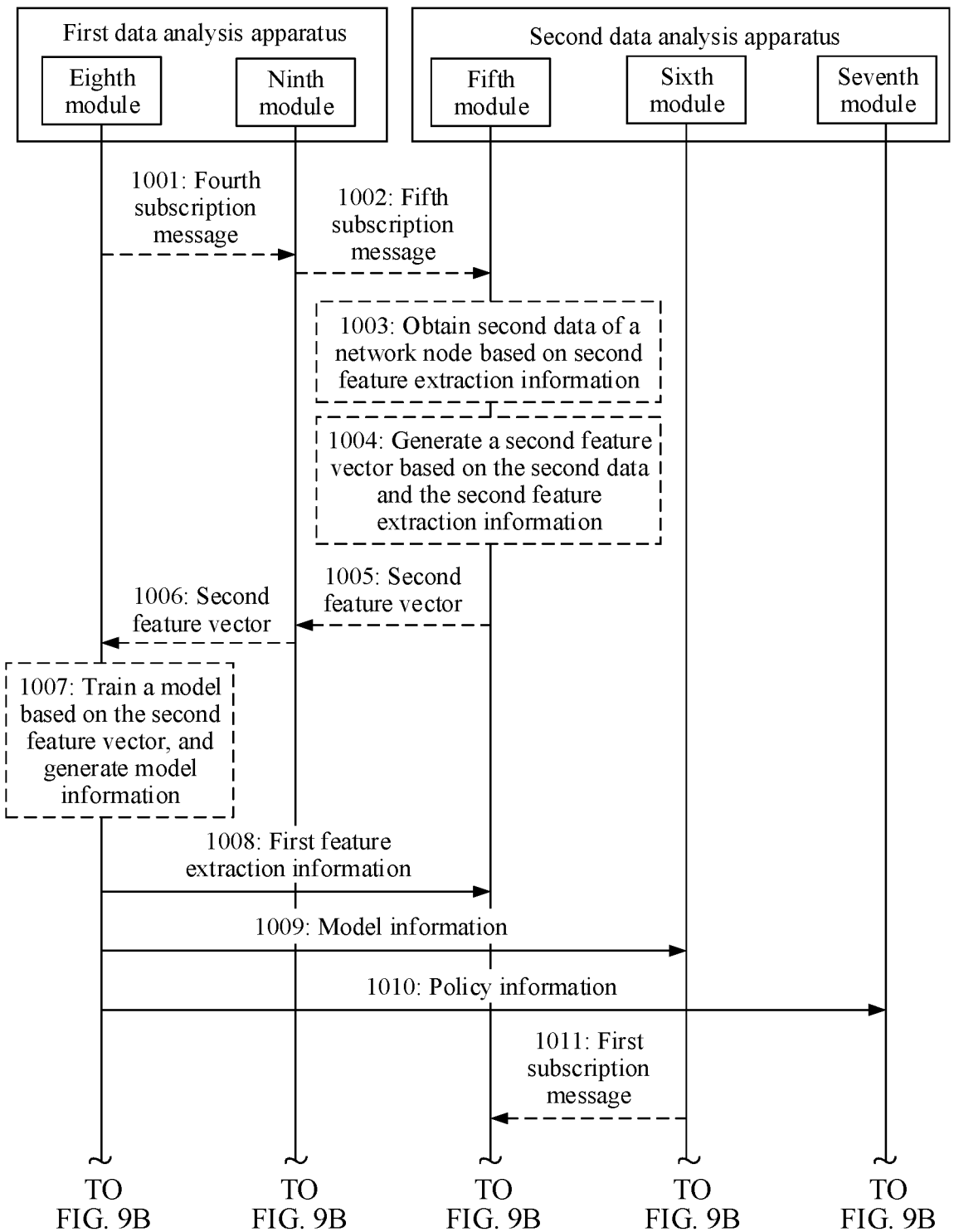
FIG. 9A and FIG. 9B are a schematic diagram of another data analysis method according to this application.
Figure 9B:
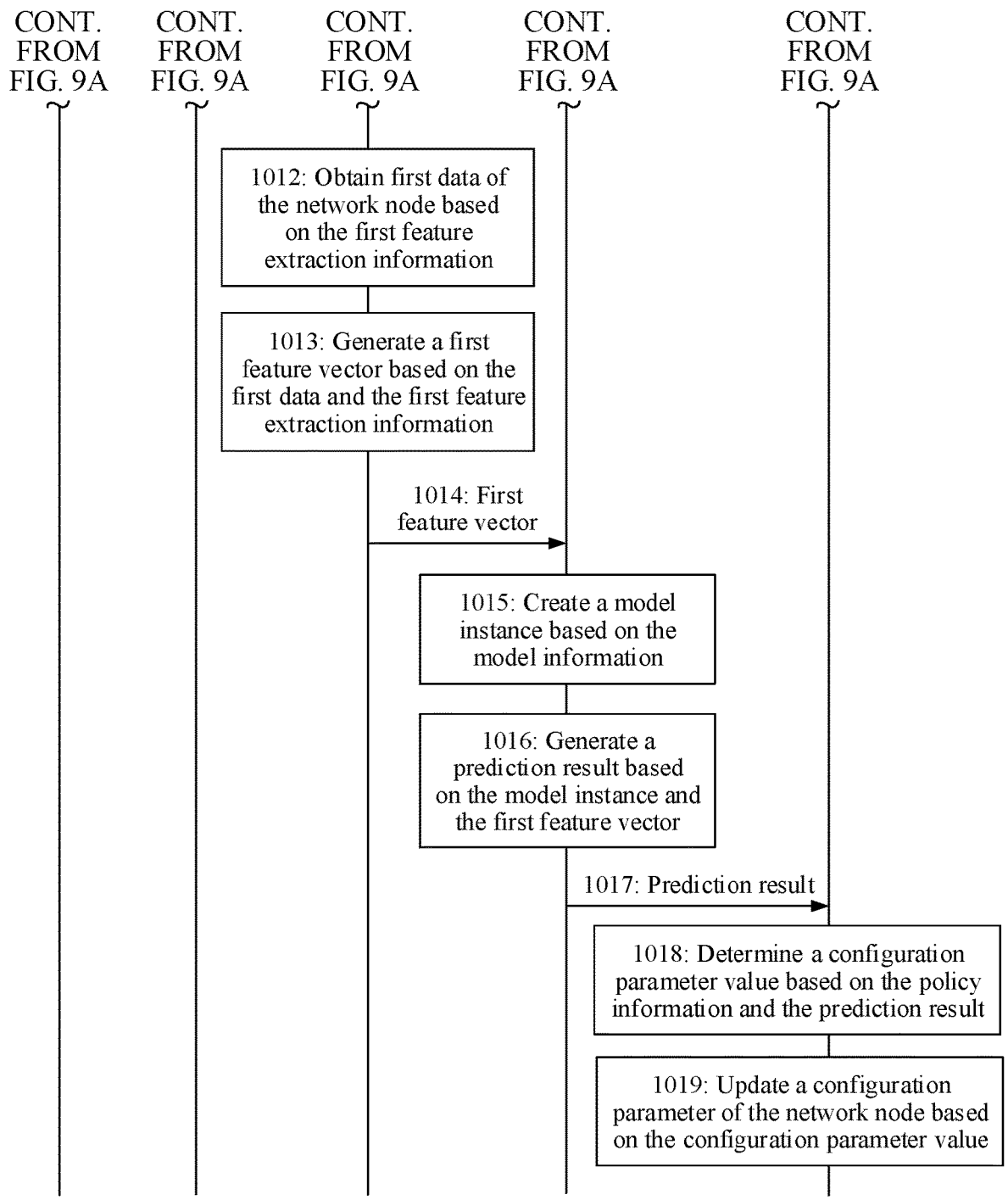

The following provides a detailed description with reference to the accompanying drawings. FIG. 9A and FIG. 9B are a schematic diagram of another data analysis method according to this application. The method includes the following steps.

Step 1001: The eighth module sends a fourth subscription message to the ninth module. Correspondingly, the ninth module receives the fourth subscription message from the eighth module.

The fourth subscription message includes second feature extraction information, the fourth subscription message is used to request to subscribe to a second feature vector of a network node, and the second data analysis apparatus is deployed in the network node.

Step 1002: The ninth module sends a fifth subscription message to the fifth module. Correspondingly, the fifth module receives the fifth subscription message from the ninth module.

The fifth subscription message includes the second feature extraction information, and the fifth subscription message is used to request to subscribe to the second feature vector of the network node. It may also be understood as that the fifth subscription message is used to subscribe to the second feature vector of the network node from the second data analysis apparatus.

Step 1003: The fifth module obtains second data of the network node based on the second feature extraction information.

A method for obtaining the second data of the network node by the fifth module in this step is similar to the method for obtaining the second data of the network node by the first module in step 402 in the embodiment shown in FIG. 4. Reference may be made to the foregoing descriptions. Details are not described herein again.

Step 1004: The fifth module generates the second feature vector based on the second data and the second feature extraction information.

A method for generating the second feature vector by the fifth module in this step is similar to the method for generating the second feature vector by the first module in step 403 in the embodiment shown in FIG. 4. Reference may be made to the foregoing descriptions. Details are not described herein again.

Step 1005: The fifth module sends the second feature vector to the ninth module. Correspondingly, the ninth module receives the second feature vector from the ninth module.

Step 1006: The ninth module sends the second feature vector to the eighth module. Correspondingly, the eighth module receives the second feature vector from the ninth module.

Step 1007: The eighth module trains a model based on the second feature vector, and generates model information.

A method for training the model based on the second feature vector and generating the model information by the eighth module in this step is similar to the method for training the model based on the second feature vector and generating the model information by the fourth module in step 403 in the embodiment shown in FIG. 4. Reference may be made to the foregoing descriptions. Details are not described herein again.

Step 1008 to step 1019 are similar to step 301 to step 311 in the embodiment shown in FIG. 3. Reference may be made to the foregoing descriptions. The operations performed by the fifth module in step 1008 to step 1019 are similar to the operations performed by the first module in step 301 to step 311. The operations performed by the sixth module in step 1008 to step 1019 are similar to the operations performed by the second module in step 301 to step 311. The operations performed by the seventh module in step 1008 to step 1019 are similar to the operations performed by the third module in step 301 to step 311. The operations performed by the eighth module in step 1008 to step 1019 are similar to the operations performed by the fourth module in step 301 to step 311.

Further, step 1008 to step 1011 in step 1008 to step 1019 may alternatively be replaced with operations similar to steps 3011 to 3041 in the embodiment shown in FIG. 5. For a specific execution method, refer to related descriptions in the embodiment shown in FIG. 5. Details are not described herein again.

According to the foregoing step 1001 to step 1007, the eighth module of the first data analysis apparatus may subscribe to, from the ninth module of the first data analysis apparatus, the second feature vector generated by the second data analysis apparatus, and then the ninth module subscribes to, from the fifth module of the second data analysis apparatus, the second feature vector generated by the second data analysis apparatus. After receiving the subscription, the fifth module of the second data analysis apparatus generates the second data based on the second feature extraction information, generates the second feature vector based on the second feature extraction information and the second data, and sends the generated second feature vector to the ninth module. The ninth module sends the received second feature vector to the eighth module. Therefore, the eighth module may perform model training based on the received second feature vector, to obtain the model information. The model information may be sent to the fifth module and used by the fifth module to generate a model instance and perform prediction by using the model instance. In this way, the first data analysis apparatus trains the model to obtain the model information, and sends the model to the second data analysis apparatus. The second data analysis apparatus creates the model instance based on the model information. In the method, model training is separated from model use. To be specific, the first data analysis apparatus performs model training, and the second data analysis apparatus uses the model. The two data analysis apparatuses may run in parallel, so that a data analysis speed of the data processing apparatus can be improved.

It should be noted that, step 1001 to step 1007 are all optional steps. If step 1001 to step 1007 are not performed, the eighth module of the first data analysis apparatus may obtain the model information in another manner. For example, another data analysis apparatus or a monitoring apparatus may complete model training and obtain the model information, and then send the model information to the eighth module of the first data analysis apparatus. Then, the eighth module of the first data analysis apparatus may send the obtained model information to the fifth module of the second data analysis apparatus.

In another implementation, the first data analysis apparatus may alternatively subscribe to the second feature vector of the network node from the fifth module of the second data analysis apparatus through the eighth module. In this embodiment, step 1001 and step 1002 shown in FIG. 9A may be replaced with the following step 1001'.

Step 1001': The eighth module sends a subscription message to the fifth module. Correspondingly, the fifth module receives the subscription message from the eighth module.

The subscription message includes the second feature extraction information, the subscription message is used to request to subscribe to the second feature vector of the network node, and the second data analysis apparatus is deployed in the network node.

Correspondingly, step 1006 and step 1007 shown in FIG. 9A may be replaced with the following step 1002':

Step 1002: The fifth module sends the second feature vector to the eighth module. Correspondingly, the eighth module receives the second feature vector from the fifth module.

Further, before step 1001, an operation similar to step 901 shown in FIG. 8 may be further included. To be specific, the eighth module receives an indication message of the monitoring apparatus. Further, after step 1019, an operation similar to step 902 shown in FIG. 8 may be further included. To be specific, the eighth module sends a response message to the monitoring apparatus. For specific implementation details, refer to the foregoing descriptions. Details are not described herein again.

Further, the first data analysis apparatus of the data analysis system shown in FIG. 6 may further include a tenth module and an eleventh module. In other words, the first data analysis apparatus includes the eighth module, the ninth module, the tenth module, and the eleventh module. In this case, the eighth module, the ninth module, the tenth module, and the eleventh module in the first data analysis apparatus cooperate with each other, to collect data of the network node (where for example, the network node is the CU shown in FIG. 1(*a*) or the first radio access device shown in FIG. 1(*b*)) in which the first data analysis apparatus is deployed, train the model, generate the model instance, perform online prediction, and generate a configuration parameter value based on the prediction result, and adjust a configuration parameter of the network node based on the configuration parameter value.

When the eighth module, the ninth module, the tenth module, and the eleventh module are configured to implement the foregoing functions, specific implementation details of the eighth module, the ninth module, the tenth module, and the eleventh module are similar to implementation processes of the fourth module, the first module, the second module, and the third module in the embodiment shown in FIG. 2. Specifically, for the operations performed by the eighth module, refer to the operations performed by the fourth module in the embodiment shown in FIG. 2. For the operations performed by the ninth module, refer to the operations performed by the first module in the embodiment shown in FIG. 2. For the operations performed by the tenth module, refer to the operations performed by the second module in the embodiment shown in FIG. 2. For the operations performed by the eleventh module, refer to the operations performed by the third module in the embodiment shown in FIG. 2. Details are not described herein again.

It should be noted that, in any one of the foregoing embodiments of this application, the first module, the second module, the third module, the fourth module, the fifth module, the sixth module, the seventh module, the eighth module, the ninth module, the tenth module, the eleventh module, the first subscription message, the second subscription message, the third subscription message, the fourth subscription message, the fifth subscription message, the monitoring apparatus, and the like each are merely a name, and the name does not constitute a limitation. In a 5G network and another future network, these names may alternatively be other names. This is not specifically limited in the embodiments of this application.

For example, the first subscription message, the second subscription message, the third subscription message, the fourth subscription message, and the fifth subscription message each may be briefly referred to as a subscription message, a request message, or the like.

For another example, the first module, the fifth module, and the ninth module each may be referred to as a data service function (DSF) module, the second module, the sixth module, and the tenth module each may be referred to as a model execution function (MEF) module, the third module, the seventh module, and the eleventh module each may be referred to as an adaptive policy function (APF) module, and the fourth module and the eighth module each may be referred to as an analysis and modeling function (A&MF) module.

For another example, the monitoring apparatus may also be referred to as an operation support system data analysis (OSSDA) apparatus.

Therefore, the present invention discloses a data analysis apparatus, including:

a first module, configured to: obtain first feature extraction information, obtain first data of a network node based on the first feature extraction information, generate a first feature vector based on the first data and the first feature extraction information, and send the first feature vector;

a second module, configured to: obtain model information, and create a model instance based on the model information; and receive the first feature vector from the first module, generate a prediction result based on the first feature vector and the model instance, and send the prediction result; and a third module, configured to: obtain policy information, receive the prediction result from the second module, determine a configuration parameter value based on the prediction result and the policy information, and update a configuration parameter of the network node based on the configuration parameter value.

In one example implementation, the apparatus further includes a fourth module, configured to send the first feature extraction information, the model information, and the policy information.

In one example implementation, that the fourth module is configured to send the first feature extraction information, the model information, and the policy information includes: the fourth module is configured to: send the model information to the second module, send the first feature extraction information to the first module, and send the policy information to the third module.

In one example implementation, the first feature extraction information includes a model identifier, the model information includes the model identifier, and the model identifier is used to identify the model instance; and the second module is further configured to send a first subscription message to the first module, where the first subscription message includes the model identifier, and the first subscription message is used to subscribe to, from the first module, the first feature vector corresponding to the model identifier.

In one example implementation, that the fourth module is configured to send the first feature extraction information, the model information, and the policy information includes: the fourth module is configured to send the first feature extraction information, the model information, and the policy information to the second module; and the second module is further configured to: send the first feature extraction information to the first module, and send the policy information to the third module.

In one example implementation, the first feature extraction information includes a model identifier, the model information includes the model identifier, and the model identifier is used to identify the model instance; and the sending, by the second module, the first feature extraction information to the first module includes: sending, by the second module, a second subscription message to the first module, where the second subscription message includes the first feature extraction information, and the second subscription message is used to subscribe to, from the first module, the first feature vector corresponding to the model identifier.

In one example implementation, the fourth module is further configured to send a third subscription message to the first module, where the third subscription message includes second feature extraction information; the first module is further configured to: obtain second data of the network node based on the second feature extraction information, generate a second feature vector based on the second data and the second feature extraction information, and send the second feature vector to the fourth module; and the fourth module is further configured to train, based on the second feature vector, a model corresponding to the model information.

In one example implementation, the fourth module is further configured to: receive an indication message from a monitoring apparatus, where the indication message includes a model type of the model corresponding to the model information, and the indication message is used to indicate to create the model and start training of the model; and send a response message to the monitoring apparatus, where the response message is used to indicate that the training of the model is completed.

In one example implementation, the obtaining, by the first module, first feature extraction information includes: obtaining, by the first module, the first feature extraction information from another data analysis apparatus; the obtaining, by the second module, model information includes: obtaining, by the second module, the model information from the another data analysis apparatus; and the obtaining, by the third module, policy information includes: obtaining, by the third module, the policy information from the another data analysis apparatus.

In one example implementation, the first data analysis apparatus is located in a central unit (CU), and the network node is the CU; or the data analysis apparatus is located in a distributed unit DU, and the network node is the DU; or the data analysis apparatus is located in a radio access device, and the network node is the radio access device.

In the foregoing data analysis apparatus, for the operations of the modules of the data analysis apparatus, refer to the operations in FIG. 3 to FIG. 5 and the foregoing related text descriptions. Details are not described herein again.

This application further provides a data analysis system, including a first data analysis apparatus and a second data analysis apparatus. The first data analysis apparatus is configured to send first feature extraction information, model information, and policy information. The second data analysis apparatus is configured to: receive the first feature extraction information, the model information, and the policy information from the first data analysis apparatus; obtain first data of a network node based on the first feature extraction information, and generate a first feature vector based on the first data and the first feature extraction information; create a model instance based on the model information; generate a prediction result based on the first feature vector and the model instance; and determine a configuration parameter value based on the prediction result and the policy information, and update a configuration parameter of the network node based on the configuration parameter value.

In one example implementation, the first data analysis apparatus is further configured to: send a subscription message to the second data analysis apparatus, where the subscription message includes second feature extraction information; and obtain a second feature vector from the second data analysis apparatus, and train, based on the second feature vector, a model corresponding to the model information; and the second data analysis apparatus is further configured to: obtain second data of the network node based on the second feature extraction information, generate the second feature vector based on the second data and the second feature extraction information, and send the second feature vector to the first data analysis apparatus.

In one example implementation, the first data analysis apparatus is further configured to: receive an indication message from a monitoring apparatus, where the indication message includes a model type of the model corresponding to the model information, and the indication message is used to indicate to create the model and start training of the model; and send a response message to the monitoring apparatus, where the response message is used to indicate that the training of the model is completed.

In one example implementation, the system further includes the monitoring apparatus.

In one example implementation, the first data analysis apparatus is located in a central unit (CU), the second data analysis apparatus is located in a distributed unit DU, and the network node is the DU; or the first data analysis apparatus is located in a first radio access device, the second data analysis apparatus is located in a second radio access device, and the network node is the second radio access device.

In the foregoing data analysis system, for the operations of the first data analysis apparatus and the second data analysis apparatus in the data analysis system, refer to the operations of the first data analysis apparatus and the second data analysis apparatus in FIG. 7 and FIG. 8 and the foregoing related text descriptions. Details are not described herein again.

Therefore, this application further provides a data analysis method, including: obtaining, by a data analysis apparatus, first feature extraction information, model information, and policy information; obtaining, by the data analysis apparatus, first data of a network node based on the first feature extraction information, generating a first feature vector based on the first data and the first feature extraction information, and creating a model instance based on the model information; generating, by the data analysis apparatus, a prediction result based on the first feature vector and the model instance; and determining, by the data analysis apparatus, a configuration parameter value based on the prediction result and the policy information, and updating a configuration parameter of the network node based on the configuration parameter value.

In one example implementation, the method further includes: obtaining, by the data analysis apparatus, second feature extraction information, and obtaining second data of the network node based on the second feature extraction information; generating, by the data analysis apparatus, a second feature vector based on the second data and the second feature extraction information; and training, by the data analysis apparatus based on the second feature vector, a model corresponding to the model information.

In one example implementation, the method further includes: receiving, by the data analysis apparatus, an indication message from a monitoring apparatus, where the indication message includes a model type of the model corresponding to the model information, and the indication message is used to indicate to create the model and start training of the model; and sending, by the data analysis apparatus, a response message to the monitoring apparatus, where the response message is used to indicate that the training of the model is completed.

In one example implementation, the first data analysis apparatus is located in a central unit (CU), and the network node is the CU; or the data analysis apparatus is located in a distributed unit DU, and the network node is the DU; or the data analysis apparatus is located in a radio access device, and the network node is the radio access device.

In the foregoing data analysis method, for the operations in the data analysis method, refer to the operations in FIG. 3 to FIG. 5 and the foregoing related text descriptions. Details are not described herein again.

Therefore, this application further provides a data analysis method, including: obtaining, by a first data analysis apparatus, model information; and obtaining, by the first data analysis apparatus, first feature extraction information and policy information, and sending the first feature extraction information, the model information, and the policy information to a second data analysis apparatus.

In one example implementation, the obtaining, by a first data analysis apparatus, model information includes: receiving, by the first data analysis apparatus, an indication message from a monitoring apparatus, where the indication message includes a model type, and the indication message is used to indicate to create a model and start training of the model; and creating the model based on the model type and training the model, to obtain the model information.

In one example implementation, the creating, by the first data analysis apparatus, the model based on the model type and training the model includes: sending, by the first data analysis apparatus, a subscription message to the second data analysis apparatus, where the subscription message includes second feature extraction information; receiving, by the first data analysis apparatus, a second feature vector from the second data analysis apparatus, where the second feature vector is generated based on the second feature extraction information; and training, by the first data analysis apparatus based on the second feature vector, the model corresponding to the model type, to obtain the model information.

In the foregoing data analysis method, for the operations of the first data analysis apparatus, refer to the operations of the first data analysis apparatus in FIG. 7 and FIG. 8 and the foregoing related text descriptions. Details are not described herein again.

Therefore, this application further provides a data analysis method, including: receiving, by a second data analysis apparatus, first feature extraction information, model information, and policy information from a first data analysis apparatus;

obtaining, by the second data analysis apparatus, first data of a network node based on the first feature extraction information, and generating a first feature vector based on the first data and the first feature extraction information; creating a model instance based on the model information; generating, by the second data analysis apparatus, a prediction result based on the first feature vector and the model instance; and determining, by the second data analysis apparatus, a configuration parameter value based on the prediction result and the policy information, and updating a configuration parameter of the network node based on the configuration parameter value.

In one example implementation, the method further includes: receiving, by the second data analysis apparatus, a subscription message from the first data analysis apparatus, where the subscription message includes second feature extraction information; and obtaining, by the second data analysis apparatus, second data of the network node based on the second feature extraction information, and generating a second feature vector based on the second data and the second feature extraction information; and sending, by the second data analysis apparatus, the second feature vector to the first data analysis apparatus.

In the foregoing data analysis method, for the operations of the second data analysis apparatus, refer to the operations of the second data analysis apparatus in FIG. 7 and FIG. 8 and the foregoing related text descriptions. Details are not described herein again.

Further, in any foregoing apparatus, any system, or any method provided in this application, the first feature extraction information includes input data parameter information, feature processing information, and output feature vector information, the input data parameter information is used to indicate to collect the first data, the feature processing information is used to indicate a processing manner of converting the first data into the first feature vector, and the output feature vector information is used to indicate a format of the sent first feature vector.

Further, in any foregoing apparatus, any system, or any method provided in this application, the model information includes model description information, and the model description information is used to indicate parameter information corresponding to the model instance.

Further, in any foregoing apparatus, any system, or any method provided in this application, the policy information includes configuration parameter information and prediction result information, the configuration parameter information is used to indicate the configuration parameter, and the prediction result information is used to indicate a mapping relationship between the configuration parameter value of the configuration parameter and the prediction result.

Figure 10:
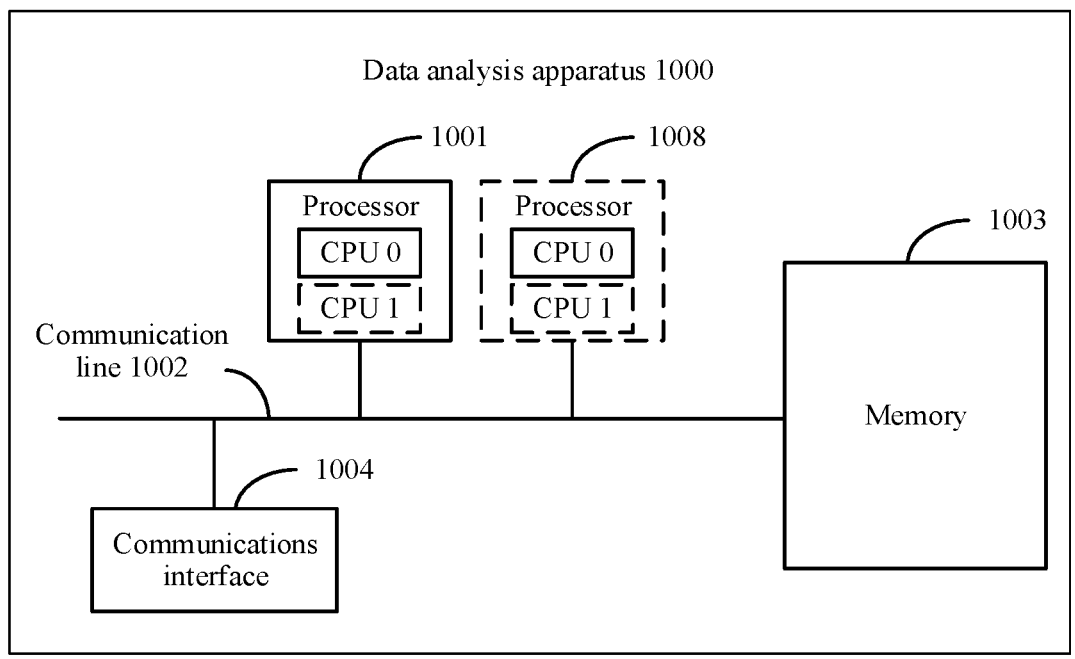
FIG. 10 is a schematic diagram of a data analysis apparatus according to this application.

Based on a same inventive idea, FIG. 10 is a schematic diagram of an apparatus according to this application. The apparatus may be a data analysis apparatus or a chip, and may perform the method in any one of the foregoing embodiments.

The apparatus 1000 includes at least one processor 1001, a communications line 1002, a memory 1003, and at least one communications interface 1004.

The processor 1001 may be a general-purpose central processing unit (CPU), a microprocessor, an application-specific integrated circuit (ASIC), or one or more integrated circuits configured to control program execution in the solutions of this application.

The communications line 1002 may include a path, to transfer information between the foregoing components.

The communications interface 1004 may be any apparatus like a transceiver, and is configured to communicate with another device or a communications network, such as Ethernet, a radio access network (RAN), a wireless local area network (WLAN), or a wired access network.

The memory 1003 may be a read-only memory (ROM) or another type of static storage device that can store static information and an instruction, a random access memory (RAM) or another type of dynamic storage device that can store information and an instruction; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor by using the communications line 1002. The memory may alternatively be integrated with the processor.

The memory 1003 is configured to store a computer-executable instruction for executing the solutions of this application, and the processor 1001 controls the execution. The processor 1001 is configured to execute the computer-executable instruction stored in the memory 1003, to implement the multicast packet sending method provided in the following embodiments of this application.

In some embodiments, the computer-executable instruction in this embodiment of this application may also be referred to as application program code. This is not specifically limited in this embodiment of this application.

During example implementation, in an embodiment, the processor 1001 may include one or more CPUs, such as a CPU 0 and a CPU 1 in FIG. 10.

During example implementation, in an embodiment, the apparatus 1000 may include a plurality of processors, for example, the processor 1001 and a processor 1008 in FIG. 10. Each of the processors may be a single-core (single-CPU) processor, or may be a multi-core (multi-CPU) processor. The processor herein may be one or more devices, circuits, and/or processing cores for processing data (for example, a computer program instruction).

When the apparatus shown in FIG. 10 is a chip, for example, may be a chip of a data analysis apparatus, the chip includes the processor 1001 (where the chip may further include the processor 1008), the communications line 1002, the memory 1003, and the communications interface 1004. Specifically, the communications interface 1004 may be an input interface, a pin, a circuit, or the like. The memory 1003 may be a register, a cache, or the like. The processor 1001 and the processor 1008 each may be a general-purpose CPU, a microprocessor, an ASIC, or one or more integrated circuits configured to control program execution of the data analysis method in any one of the foregoing embodiments.

When the apparatus shown in FIG. 10 is an example implementation of the data analysis apparatus shown in FIG. 2, the processor 1001 may be configured to implement processing functions of the first module, the second module, the third module, and the fourth module in FIG. 2. For example, the processor 1001 is configured to implement step 305, step 306, step 308, step 309, step 311, and step 312 shown in FIG. 3, or may be configured to implement step 402, step 403, and step 405 shown in FIG. 4, or may be configured to implement step 305, step 306, step 308, step 309, step 311, and step 312 shown in FIG. 5. The communications interface 1004 may be configured to implement step 301 to step 304, step 307, and step 310 shown in FIG. 3, or may be configured to implement step 401, step 404, step 501, and step 502 shown in FIG. 4, or may be configured to implement step 3011 to step 3041, step 307, and step 310 shown in FIG. 5. The memory 1003 may be configured to store first data, second data, a first feature vector, a second feature vector, a model instance, first feature extraction information, second feature extraction information, model information, policy information, a prediction result, a configuration parameter value, and the like that are generated when the foregoing data analysis method is implemented.

When the apparatus shown in FIG. 10 is a specific implementation of the first data analysis apparatus shown in FIG. 6, the processor 1001 may be configured to implement a processing function of the first data analysis apparatus in FIG. 8, for example, configured to implement step 805 shown in FIG. 8. Alternatively, the processor 1001 may be configured to implement functions of the eighth module and the ninth module shown in FIG. 9A and FIG. 9B, for example, configured to implement step 1007 shown in FIG. 9A. The communications interface 1004 may be configured to implement step 701 shown in FIG. 7, or may be configured to implement step 801, step 804, step 901, and step 902 shown in FIG. 8, or may be configured to implement step 1002, step 1005, and step 1008 to step 1010 shown in FIG. 9A. The memory 1003 may be configured to store first data, second data, a first feature vector, a second feature vector, a model instance, first feature extraction information, second feature extraction information, model information, policy information, a prediction result, a configuration parameter value, and the like that are generated when the foregoing data analysis method is implemented.

When the apparatus shown in FIG. 10 is an example implementation of the second data analysis apparatus shown in FIG. 6, the processor 1001 may be configured to implement a processing function of the second data analysis apparatus in FIG. 7, for example, configured to implement step 702 to step 707 shown in FIG. 7. Alternatively, the processor 1001 may be configured to implement a processing function of the second data analysis apparatus in FIG. 8, for example, configured to implement step 802 and step 803 shown in FIG. 8. Alternatively, the processor 1001 may be configured to implement functions of the fifth module, the sixth module, and the seventh module shown in FIG. 9A and FIG. 9B, for example, configured to implement step 1003, step 1004, step 1012, step 1013, step 1015, step 1016, step 1018, and step 1019 shown in FIG. 9A and FIG. 9B. The communications interface 1004 may be configured to implement step 701 shown in FIG. 7, or may be configured to implement step 801 and step 804 shown in FIG. 8, or may be configured to implement step 1002, step 1005, and step 1008 to step 1010 shown in FIG. 9A. The memory 1003 may be configured to store first data, second data, a first feature vector, a second feature vector, a model instance, first feature extraction information, second feature extraction information, model information, policy information, a prediction result, a configuration parameter value, and the like that are generated when the foregoing data analysis method is implemented.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. In some embodiments, the general-purpose processor may also be any traditional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to the processor, so that the processor may read information from the storage medium and write information to the storage medium. Alternatively, the storage medium may alternatively be integrated into the processor. The processor and the storage medium may be arranged in an ASIC, and the ASIC may be arranged in terminal device. Alternatively, the processor and the storage medium may alternatively be arranged in different components of the terminal device.

These computer program instructions may also be loaded onto a computer or another programmable data processing device, so that a series of operations and steps are performed on the computer or the another programmable device, to generate computer-implemented processing. Therefore, the instructions executed on the computer or the another programmable device provide steps for implementing a step of a specific function in one or more processes in the flowcharts and/or in one or more blocks in the block diagrams.

Although the present invention is described with reference to specific features and the embodiments thereof, obviously, various modifications and combinations may be made to them without departing from the spirit and scope of the present invention. Correspondingly, the specification and accompanying drawings are merely example descriptions of the present invention defined by the accompanying claims, and are considered as any of or all modifications, variations, combinations or equivalents that cover the scope of the present invention. Obviously, a person skilled in the art can make various modifications and variations to the present invention without departing from the spirit and scope of the present invention. The present invention is intended to cover these modifications and variations provided that they fall within the scope of the claims of the present invention and their equivalent technologies.

What is claimed is:

1. A data analysis apparatus, comprising a first circuit, a second circuit a third circuit, and a fourth circuit wherein:
   the first circuit is configured to: obtain first feature extraction information, obtain first data of a network node based on the first feature extraction information, generate a first feature vector based on the first data and the first feature extraction information, and send the first feature vector to the second circuit;
   the second circuit is configured to: obtain model information, and create a model instance based on the model information, receive the first feature vector from the first circuit, generate a prediction result based on the first feature vector and the model instance, and send the prediction result;
   the third circuit is configured to: obtain policy information, receive the prediction result from the second circuit, determine a configuration parameter value based on the prediction result and the policy information, and update a configuration parameter of the network node based on the configuration parameter value;
   wherein the first circuit receives the first feature extraction information, the second circuit receives the model information, and the third circuit receives the policy information, each from the fourth circuit, and the fourth circuit is configured to send second feature extraction information to the first circuit;
   the first circuit is further configured to: obtain second data of the network node based on the second feature extraction information, generate a second feature vector based on the second data and the second feature extraction information, and send the second feature vector to the fourth circuit; and
   the fourth circuit is further configured to train, based on the second feature vector, a model corresponding to the model information.

2. The apparatus according to claim 1, wherein the first feature extraction information comprises a model identifier, the model information comprises the model identifier, and the model identifier is used to identify the model instance; and the second circuit is further configured to send a first subscription message to the first circuit, wherein the first subscription message comprises the model identifier, and the first subscription message is used to subscribe to, from the first circuit, the first feature vector corresponding to the model identifier.

3. The apparatus according to claim 1, wherein that the fourth circuit is configured to send the first feature extraction information, the model information, and the policy information comprises: the fourth circuit is configured to send the first feature extraction information, the model information, and the policy information to the second circuit; and the second circuit is further configured to: send the first feature extraction information to the first circuit, and send the policy information to the third circuit.

4. The apparatus according to claim 3, wherein the first feature extraction information comprises a model identifier, the model information comprises the model identifier, and the model identifier is used to identify the model instance; and sending, by the second circuit, the first feature extraction information to the first circuit comprises: sending, by the second circuit, a second subscription message to the first circuit, wherein the second subscription message comprises the first feature extraction information, and the second subscription message is used to subscribe to, from the first circuit, the first feature vector corresponding to the model identifier.

5. The apparatus according to claim 1, wherein the fourth circuit is further configured to: receive an indication message from a monitoring apparatus, wherein the indication message comprises a model type of the model corresponding to the model information, and the indication message is used to indicate to create the model and start training of the model; and send a response message to the monitoring apparatus, wherein the response message is used to indicate that the training of the model is completed.

6. The apparatus according to claim 1, wherein obtaining, by the first circuit, the first feature extraction information comprises:

obtaining, by the first circuit, the first feature extraction information from another data analysis apparatus;

the obtaining, by the second circuit, the model information comprises:

obtaining, by the second circuit, the model information from the another data analysis apparatus; and, wherein obtaining, by the third circuit, the policy information comprises:

obtaining, by the third circuit, the policy information from the another data analysis apparatus.

7. The apparatus according to claim 1, wherein the data analysis apparatus is located in a central unit (CU), and the network node is the CU;

the data analysis apparatus is located in a distributed unit (DU), and the network node is the DU; or the data analysis apparatus is located in a radio access device, and the network node is the radio access device.

8. A data analysis method, comprising:

obtaining, by a data analysis apparatus, first feature extraction information, model information, and policy information;

obtaining, by the data analysis apparatus, first data of a network node based on the first feature extraction information;

generating, by the data analysis apparatus, a first feature vector based on the first data and the first feature extraction information, and creating a model instance based on the model information;

generating, by the data analysis apparatus, a prediction result based on the first feature vector and the model instance;

determining, by the data analysis apparatus, a configuration parameter value based on the prediction result and the policy information, and updating a configuration parameter of the network node based on the configuration parameter value;

receiving, by the data analysis apparatus, an indication message from a monitoring apparatus, wherein the indication message comprises a model type of the model corresponding to the model information, and the indication message is used to indicate to the data analysis apparatus create the model and start training of the model;

obtaining, by the data analysis apparatus, second feature extraction information, and obtaining second data of the network node based on the second feature extraction information;

generating, by the data analysis apparatus, a second feature vector based on the second data and the second feature extraction information;

training, by the data analysis apparatus based on the second feature vector, a model corresponding to the model information; and sending, by the data analysis apparatus, a response message to the monitoring apparatus, wherein the response message is used to indicate that the training of the model is completed.

9. The method according to claim 8, wherein the data analysis apparatus is located in a central unit (CU), and the network node is the CU;

the data analysis apparatus is located in a distributed unit (DU), and the network node is the DU; or the data analysis apparatus is located in a radio access device, and the network node is the radio access device.

10. A data analysis method, comprising:

obtaining, by a first data analysis apparatus, model information by receiving an indication message from a monitoring apparatus, wherein the indication message comprises a model type, and the indication message is used to indicate to create a model and start training of the model;

creating the model based on the model type and training the model, to obtain the model information; and obtaining, by the first data analysis apparatus, first feature extraction information and policy information, and sending the first feature extraction information, the model information, and the policy information to a second data analysis apparatus;

obtaining, by the first data analysis apparatus, second feature extraction information, and obtaining second data of the network node based on the second feature extraction information;

generating, by the first data analysis apparatus, a second feature vector based on the second data and the second feature extraction information;

training, by the first data analysis apparatus based on the second feature vector, a model corresponding to the model information; and sending, by the first data analysis apparatus, a response message to the monitoring apparatus, wherein the response message is used to indicate that the training of the model is completed.

11. The data analysis method according to claim 10, wherein creating, by the first data analysis apparatus, the model based on the model type and training the model comprises:
- sending, by the first data analysis apparatus, a subscription message to the second data analysis apparatus, wherein the subscription message comprises second feature extraction information;
- receiving, by the first data analysis apparatus, the second feature vector from the second data analysis apparatus, wherein the second feature vector is generated based on the second feature extraction information; and
- training, by the first data analysis apparatus based on the second feature vector, the model corresponding to the model type, to obtain the model information.

* * * * *

UNITED STATES PATENT AND TRADEMARK OFFICE
CERTIFICATE OF CORRECTION

PATENT NO. : 11,523,288 B2
APPLICATION NO. : 16/985195
DATED : December 6, 2022
INVENTOR(S) : Jin Zhang et al.

It is certified that error appears in the above-identified patent and that said Letters Patent is hereby corrected as shown below:

In the Claims

In Column 36, Line 29, in Claim 1, delete "circuit" and insert -- circuit, --.

Signed and Sealed this
Thirty-first Day of January, 2023

Katherine Kelly Vidal
Director of the United States Patent and Trademark Office